US012719663B2

(12) United States Patent
Colnot et al.

(10) Patent No.: US 12,719,663 B2
(45) Date of Patent: Aug. 25, 2026

(54) SECURE CHANNEL ESTABLISHMENT

(71) Applicant: Mastercard International Incorporated, New York, NY (US)

(72) Inventors: Cédric Colnot, Uccle (BE); Jean-Bernard Collet, Vedrin (BE); Duncan Garrett, London (GB)

(73) Assignee: Mastercard International Incorporated, Purchase, NY (US)

( * ) Notice: Subject to any disclaimer, the term of this patent is extended or adjusted under 35 U.S.C. 154(b) by 117 days.

(21) Appl. No.: 18/559,848

(22) PCT Filed: Apr. 25, 2022

(86) PCT No.: PCT/US2022/026134
§ 371 (c)(1),
(2) Date: Nov. 9, 2023

(87) PCT Pub. No.: WO2022/240578
PCT Pub. Date: Nov. 17, 2022

(65) Prior Publication Data

US 2024/0380577 A1 Nov. 14, 2024

(30) Foreign Application Priority Data

May 12, 2021 (GB) ..................................... 2106783

(51) Int. Cl.
*H04L 9/08* (2006.01)
*G06Q 20/32* (2012.01)
*G06Q 20/38* (2012.01)

(52) U.S. Cl.
CPC ....... *H04L 9/0838* (2013.01); *G06Q 20/3226* (2013.01); *G06Q 20/382* (2013.01)

(58) Field of Classification Search
CPC ....... H04L 9/0838; H04L 9/0827; H04L 9/40; H04L 2209/805; H04L 63/0478;
(Continued)

(56) References Cited

U.S. PATENT DOCUMENTS 6,000,832 A 12/1999 Franklin
6,327,578 B1 12/2001 Linehan
(Continued)

FOREIGN PATENT DOCUMENTS

AU 2022212777 A1 * 9/2023 ........... H04L 9/0855
CN 101192295 A 6/2008
(Continued)

OTHER PUBLICATIONS

PCT International Search Report and Written Opinion; PCT/US2022/026134; Jul. 8, 2022.
(Continued)

*Primary Examiner* — John B King
(74) *Attorney, Agent, or Firm* — Pramudji Law Group PLLC; Ari Pramudji

(57) ABSTRACT

There is provided a computer-implemented method for establishing a communication channel for exchanging messages securely between an initiator device and an endpoint device using an intermediary server. The initiator device is in communication with the intermediary server via a first session encrypted according to a cryptographic protocol. The endpoint device is in communication with the intermediary server via a second session encrypted according to a cryptographic protocol. A request for a handover token via the first session is sent to intermediary server. The handover token includes data that has been generated at the endpoint device and is configured to be used in setting up the communication channel between the initiator device and the endpoint device. The handover token is received from the intermediary server via the first session encrypted according to a cryptographic protocol. The communication channel is established between the initiator device and the endpoint device.

20 Claims, 21 Drawing Sheets

(58) Field of Classification Search
CPC ... H04L 63/045; H04L 63/062; H04L 9/0819; H04L 63/06; G06Q 20/3226; G06Q 20/382; G06Q 20/027; G06Q 20/10; G06Q 20/204; G06Q 20/3278; G06Q 20/341; G06Q 20/32; H04W 12/03; H04W 12/043; H04W 12/041; H04W 12/47; H04W 12/0431
See application file for complete search history.

(56) References Cited

U.S. PATENT DOCUMENTS 6,434,238 B1 8/2002 Chaum et al.
7,027,773 B1 4/2006 McMillin
7,357,309 B2 4/2008 Ghosh
7,526,448 B2 4/2009 Zielke et al.
7,657,748 B2 2/2010 Gentry
7,707,405 B1 * 4/2010 Gilman ................ H04L 63/062 713/173
8,526,607 B2 * 9/2013 Liu ...................... H04L 9/3093 726/4
8,720,771 B2 5/2014 MacKinnon
9,195,984 B1 11/2015 Spector
9,262,651 B2 2/2016 Paulsen
9,595,030 B2 3/2017 Ekselius
9,674,892 B1 6/2017 Li
9,741,036 B1 8/2017 Grassadonia
9,774,401 B1 9/2017 Borrill
10,404,703 B1 9/2019 Peterson
10,496,856 B2 12/2019 Palermo
10,552,840 B2 2/2020 Smetz
RE47,894 E 3/2020 Wang
10,706,400 B1 7/2020 Puffer et al.
10,721,274 B1 7/2020 Prasad
10,902,423 B2 1/2021 Radu et al.
10,903,990 B1 * 1/2021 Ladd .................... H04L 9/0841
10,963,871 B2 3/2021 Safak et al.
11,074,564 B2 7/2021 Gurunathan et al.
11,080,697 B2 8/2021 Lakka et al.
11,080,713 B2 8/2021 Kohli
11,093,938 B2 8/2021 Parekh
11,107,066 B1 8/2021 Maeng
11,107,078 B2 8/2021 Mariappan et al.
11,157,896 B2 10/2021 Nwokolo et al.
11,301,865 B2 4/2022 Tang
11,316,844 B2 4/2022 Krishnaiah
11,423,375 B2 8/2022 Iyer et al.
11,544,781 B2 1/2023 Dogin
11,595,389 B1 2/2023 Madden
12,452,081 B2 * 10/2025 Garg ........................ H04L 9/50
2002/0018569 A1 * 2/2002 Panjwani ............ H04L 63/0869 380/247
2004/0019571 A1 1/2004 Hurwitz
2004/0230799 A1 * 11/2004 Davis ................... H04L 9/3273 713/169
2005/0235148 A1 * 10/2005 Scheidt ............. G06Q 20/3829 713/168
2006/0049258 A1 3/2006 Pikivi
2006/0219776 A1 10/2006 Finn
2006/0283960 A1 12/2006 Top
2007/0022058 A1 1/2007 Labrou et al.
2007/0125840 A1 6/2007 Law et al.
2008/0071681 A1 3/2008 Khalid
2008/0212771 A1 * 9/2008 Hauser ................. G07F 7/1008 726/6
2009/0048971 A1 2/2009 Hathaway et al.
2009/0104888 A1 4/2009 Cox
2009/0154708 A1 * 6/2009 Kolar Sunder ....... H04L 63/062 380/279
2010/0327054 A1 12/2010 Hammad
2011/0022521 A1 1/2011 Collinge et al.
2011/0184867 A1 7/2011 Varadarajan
2011/0215159 A1 9/2011 Jain
2011/0238573 A1 9/2011 Varadarajan
2012/0036360 A1 2/2012 Bassu et al.
2012/0116902 A1 5/2012 Cardina et al.
2013/0182845 A1 7/2013 Monica et al.
2013/0212007 A1 8/2013 Mattsson
2013/0212025 A1 8/2013 Tanner
2013/0262296 A1 10/2013 Thomas et al.
2013/0262858 A1 10/2013 Neuman et al.
2013/0297508 A1 11/2013 Belamant
2013/0332344 A1 12/2013 Weber
2013/0332739 A1 * 12/2013 Yi ...................... H04W 12/041 713/171
2014/0040139 A1 2/2014 Brudnicki
2014/0061302 A1 3/2014 Hammad
2014/0122888 A1 * 5/2014 Yoon .................... H04L 9/0847 713/171
2014/0138435 A1 5/2014 Khalid
2014/0189359 A1 7/2014 Marien
2014/0191031 A1 7/2014 Paulsen
2014/0258135 A1 9/2014 Park
2014/0279556 A1 9/2014 Priebatsch et al.
2014/0358777 A1 12/2014 Gueh
2015/0032627 A1 1/2015 Dill et al.
2015/0032636 A1 1/2015 Wedekind
2015/0039890 A1 * 2/2015 Khosravi ............. H04L 63/061 713/171
2015/0046339 A1 2/2015 Wong
2015/0112870 A1 4/2015 Nagasundaram et al.
2015/0127547 A1 5/2015 Powell et al.
2015/0137949 A1 5/2015 Rofougaran et al.
2015/0142673 A1 5/2015 Nelsen et al.
2015/0262180 A1 9/2015 Hambleton
2015/0269566 A1 9/2015 Gaddam et al.
2015/0294305 A1 10/2015 Wang
2015/0302390 A1 10/2015 Huxham et al.
2015/0310425 A1 10/2015 Cacioppo
2016/0005037 A1 1/2016 Eilertsen
2016/0007196 A1 1/2016 Jepson et al.
2016/0013935 A1 * 1/2016 Pahl ....................... H04L 9/321 713/171
2016/0065370 A1 3/2016 Le Saint
2016/0071095 A1 3/2016 Foerster et al.
2016/0117715 A1 4/2016 Gross et al.
2016/0217467 A1 7/2016 Smets et al.
2016/0218875 A1 * 7/2016 Le Saint .............. H04L 9/0822
2016/0224971 A1 8/2016 Aabye
2016/0307186 A1 10/2016 Noe
2017/0070485 A1 * 3/2017 Kumar ................. H04L 9/3066
2017/0091758 A1 3/2017 Kim et al.
2017/0178090 A1 6/2017 Sarin
2017/0221056 A1 8/2017 Karpenko et al.
2017/0330181 A1 11/2017 Ortiz
2017/0330184 A1 11/2017 Sabt
2017/0344974 A1 11/2017 Britt
2017/0366344 A1 * 12/2017 Berzin ................. H04L 9/0844
2017/0373852 A1 12/2017 Cassin et al.
2018/0005231 A1 1/2018 Grassadonia et al.
2018/0006821 A1 1/2018 Kinagi
2018/0025354 A1 1/2018 Groarke et al.
2018/0047016 A1 2/2018 Sarin
2018/0068293 A1 3/2018 Dunne
2018/0097639 A1 * 4/2018 Gulati ..................... G09C 1/00
2018/0167367 A1 6/2018 John et al.
2018/0232734 A1 8/2018 Smets et al.
2018/0240115 A1 8/2018 Wong et al.
2018/0349907 A1 12/2018 Dixon
2019/0026716 A1 1/2019 Anbukkarasu
2019/0034929 A1 1/2019 Tang et al.
2019/0044734 A1 2/2019 Lancashire et al.
2019/0066097 A1 2/2019 Mackie
2019/0075094 A1 3/2019 Clarke
2019/0108462 A1 4/2019 Deloo
2019/0147449 A1 5/2019 Cole
2019/0188696 A1 6/2019 Carpenter et al.
2019/0196935 A1 6/2019 Edwards
2019/0205575 A1 7/2019 Gardiner et al.
2019/0213585 A1 7/2019 Patni
2019/0228408 A1 7/2019 Sing
2019/0229897 A1 * 7/2019 Verrall ................. H04L 9/0894
2019/0253434 A1 8/2019 Biyani et al.
2019/0318345 A1 10/2019 Kallugudde

(56) References Cited

U.S. PATENT DOCUMENTS

2019/0362339 A1 11/2019 Gurunathan et al.
2019/0392411 A1 12/2019 Jain et al.
2020/0019961 A1 1/2020 Silvestre
2020/0027078 A1 1/2020 Kallugudde et al.
2020/0027086 A1 1/2020 Rao et al.
2020/0090184 A1 3/2020 Kallugudde et al.
2020/0154270 A1 5/2020 Byington et al.
2020/0160325 A1 5/2020 Kim et al.
2020/0219090 A1 7/2020 Zarakas et al.
2020/0265420 A1 8/2020 Hamdan et al.
2020/0302441 A1 9/2020 Collinge et al.
2020/0410483 A1 12/2020 Dill et al.
2021/0012322 A1 1/2021 Manchanda
2021/0064778 A1* 3/2021 Vladimerou .......... H04L 9/0866
2021/0065156 A1 3/2021 Kadiwala et al.
2021/0073793 A1 3/2021 Govindarajan et al.
2021/0073913 A1 3/2021 Ingargiola
2021/0176051 A1* 6/2021 Falk ........................ H04L 69/22
2021/0217005 A1 7/2021 Mehrhoff et al.
2021/0287211 A1 9/2021 Aabye et al.
2021/0374708 A1 12/2021 Dunjic
2022/0045848 A1* 2/2022 Hulshof ................ H04L 9/3271
2022/0122081 A1 4/2022 Wagner et al.
2022/0156723 A1 5/2022 Lovato et al.
2022/0198428 A1 6/2022 Peterson
2022/0248221 A1* 8/2022 Nix ....................... H04W 12/02
2022/0400102 A1* 12/2022 Moon ....................... H04L 9/40
2024/0127230 A1 4/2024 Hecht et al.
2024/0257092 A1 8/2024 Bimolaksono et al.
2025/0030684 A1 1/2025 Uppalapati
2025/0247226 A1* 7/2025 Lechner .................... H04L 9/14

FOREIGN PATENT DOCUMENTS

EP 0919945 A2 6/1999
EP 1773018 A1 4/2007
EP 2189934 A2 5/2010
EP 2390817 A 11/2011
EP 3618403 A1 3/2020
GB 2619913 A * 12/2023 ........... H04L 9/0855
GB 2631356 A * 1/2025 ........... H04L 9/0852
JP 2008129890 A 6/2008
JP 2008-204248 A 9/2008
KR 10-2014-0008668 A 1/2014
KR 101502460 B1 3/2015
KR 2016-0099464 A 8/2016
KR 101679783 B1 11/2016
KR 2016-0140216 A 12/2016
KR 20170058903 A 5/2017
WO 1997046964 A1 12/1997
WO 2001-099070 A2 12/2001
WO 2003-038719 A1 5/2003
WO 2008-059465 A2 5/2008
WO 2010-070539 A1 6/2010
WO 2010-099352 A1 9/2010
WO 2013-050296 A1 4/2013
WO 2013155627 A1 10/2013
WO 2014081494 A1 5/2014
WO 2016-033610 A1 3/2016
WO 2016-123309 A1 8/2016
WO 2016-161000 A1 10/2016
WO 2017007935 A1 1/2017
WO 2018-031856 A1 2/2018
WO 2019136044 A1 7/2019
WO 2019-161003 A1 8/2019
WO 2020-243286 A 12/2020

OTHER PUBLICATIONS

UKIPO Search Report; GB GB 2106783.0; Feb. 7, 2022.
Zouina, et al.; Towards a Distributed Token Based Payment System Using Blockchain Technology; 2019 International Conference on Advanced Communication Technologies and Networking (CommNet); 2019 DOI: 10.1109/COMMNET.2019.8742380.
PCT/US2025/046740 International Search Report and Written Opinion dated Jan. 16, 2026, pp. 1-12.
SG Written Opinion; SG 10202204968V; Sep. 30, 2025; pp. 1-7.
SG10202204968V Written Opinion dated Jan. 23, 2025, pp. 1-26.
EPO Office Action; EP 19187159.9; Jun. 8, 2021.
EPO Search Report; EP 19187159.9; Apr. 17, 2020.
Yingjiu, et al.; A Security-Enhanced One-Time Payment Scheme for Credit Card; 14th International Workshop on Research Issues on Data Engineering; Web Services for E-Commerce and E-Government Applications (Ride'04); IEEE; 2004.
EMV MasterCard Contactless Transaction Flow, EMV Level 2 Kernels, https://www.level2kernel.com/emv-mastercard-contactless-transaction.html, 2021, pp. 1-3.
EMV Overview—Elavon Developer Portal, https://developer.elavon.com/na/docs/viaconex/1.0.0/emv-integration-guide/3_emv_overview, 2022, pp. 1-33.
EMV, https://en.wikipedia.org/wiki/EMV, Wikipedia, Jan. 18, 2022 (last edited), pp. 1-26.
Tokenization (data security), https://en.wikipedia.org/wiki/Tokenization_(data_security), Wikipedia, Jan. 8, 2022 (last edited), pp. 1-8.
EMV Integrated Circuit Card Specifications for Payment Systems, Book 4 Cardholder, Attendant, and Acquirer Interface Requirements, Nov. 2011, pp. 1-154, EMC Version 4.3 Book 4.
A Guide to EMV Chip Technology, Nov. 2014, pp. 1-36, Version 2.0, EMVCo, LLC.
Field 55: ICC Data, Elavon Developer Portal, https://developer-eu.elavon.com/docs/eisop/field-descriptions/field-55-icc-data, 2021, pp. 1-11.
Terminal verification results, https://en.wikipedia.org/wiki/Terminal_verification_results, Wikipedia, Dec. 12, 2021 (last edited), pp. 1-3.
Smart card application protocol data unit, https://en.wikipedia.org/wiki/Smart_card_application_protocol_data_unit, Wikipedia, Aug. 24, 2021 (last edited), pp. 1-3.
O. Ogundele, et al.; "The Implementation of a Full EMV Smartcard for a Point-of-Sale Transaction," World Congress on Internet Security (WorldCIS-2012), Guelph, ON, Canada, 2012, pp. 28-35.
EMVco Payment Account Reference (PAR): A Primer, Version 1.1, Secure Technology Alliance, Apr. 30, 2018, pp. 1-20.
PCT/SG2022/050327 Search Report and Written Opinion dated Dec. 23, 2022, pp. 1-20.
PCT/US2022/049771 International Search Report and Written Opinion dated Mar. 20, 2023, pp. 1-19.
PCT International Search Report and Written Opinion; PCT/US2021/047077; Dec. 14, 2021.
PCT/US2021/018344 International Search Report and Written Opinion dated May 27, 2021, pp. 1-11.
EP 20159634.3 Extended European Search Report dated Jul. 3, 20200, pp. 1-8.
PCT/US2021/042321 International Search Report and Written Opinion dated Nov. 1, 20211, pp. 1-11.
GB 2012833.6 Search Report dated Jan. 27, 2021, pp. 1-2.
PCT International Search Report and Written Opinion; PCT/US2020-039521; Oct. 14, 2020.
EP 19187159.9 European Summons to attend oral proceedings pursuant to Rule 115 (1) dated Jul. 29, 2022, pp. 1-10.
EP Communication pursuant to Article 94 (3) EPC; 19184252.5; Aug. 25, 2022, pp. 1-7.
PCT International Search Report, Application No. PCT/GB2017/051818, dated Sep. 1, 2017, 2 pp.
PCT International Search Report, Application No. PCT/US2020/040206; Oct. 21, 2020.
What Are Passkeys? Passkeys: The Next Generation of Passwords https://www.passkeys.com/what-are-passkeys, accessed Mar. 2026.
Paktiti, Maria, Device Authorization Grant: Solving OAuth for screens without keyboards https://workos.com/blog/ oauth-device-authorization-grant, May 28, 2025.

* cited by examiner

SECURE CHANNEL ESTABLISHMENT

CROSS REFERENCE TO RELATED APPLICATION

This application claims the benefit of United Kingdom Patent Application No. 2106783.0, which was filed on May 12, 2021, the entire contents of which are hereby incorporated by reference for all purposes.

TECHNICAL FIELD

The present disclosure relates to secure channel establishment. In particular, the present disclosure relates to a computer-implemented method and corresponding computing device for establishing a communication channel for exchanging messages securely between an initiator device and an endpoint device using an intermediary server.

BACKGROUND

A secure connection between two entities can provide protection against eavesdropping and tampering of communications. As an example, a Transport Layer Security (TLS) protocol connection enables communications between two entities to be encrypted to reduce eavesdropping and tampering.

A TLS protocol connection typically requires additional certificate exchanges, as well as additional public key cryptography signing operations, e.g. RSA or Elliptic Curve cryptography. Furthermore, in peer-to-peer connections, the same certification authority is required for both entities for the TLS protocol to be set up.

In payment systems, TLS protocols can be used to enable communications between a merchant payment terminal and a merchant gateway to be encrypted. A payment system typically uses an EMV payment card, which is a particular example of a transaction device, to perform a payment transaction. The EMV payment card normally contains secure information in a chip to support performance of a transaction. In order to initiate a payment transaction, the EMV payment card can interact with a merchant's payment terminal through EMV channels, by inserting the payment card into a card reader at the payment terminal and reading the card data from the chip. Alternatively, card data can be read from the payment card in a contactless manner, namely by bringing the payment card into proximity with a contactless card reader at the payment terminal. Existing security features of EMV payment cards allow the payment terminal to authenticate the cardholder and the payment card as well as the issuer to authorize the transaction. A problem with EMV payment cards is that they have limited capabilities in terms of interoperability, interactivity and personalised services. EMV payment cards can be digitalized in a mobile device, such that card data can be read from the mobile device instead of the EMV payment card itself; nevertheless, the vast majority of payment transactions are performed using physical payment cards.

The present disclosure has been devised to mitigate or overcome at least some of the above-mentioned problems.

SUMMARY OF THE DISCLOSURE

According to a first aspect of the present disclosure, there is provided a computer-implemented method for establishing a communication channel for exchanging messages securely between an initiator device and an endpoint device using an intermediary server, wherein the initiator device is in communication with the intermediary server via a first session encrypted according to a cryptographic protocol, and the endpoint device is in communication with the intermediary server via a second session encrypted according to a cryptographic protocol, and wherein the method is performed at the initiator device. The method comprises sending, to the intermediary server, a request for a handover token (HT) via the first session encrypted according to a cryptographic protocol, wherein the handover token (HT) comprises data that has been generated at the endpoint device and is configured to be used in setting up the communication channel between the initiator device and the endpoint device; receiving, from the intermediary server, the handover token (HT) via the first session encrypted according to a cryptographic protocol; and establishing, using the handover token (HT), the communication channel between the initiator device and the endpoint device.

Preferably, the first session encrypted according to a cryptographic protocol is a first TLS session, and the second session encrypted according to a cryptographic protocol is a second TLS session. TLS is an example of a secure cryptographic protocol. Alternative secure cryptographic protocols may be used instead of the first TLS session and second TLS session.

The present disclosure relates to establishing a secure communication channel between an initiator device and an endpoint device. Establishment of the secure communication channel as claimed in the present disclosure provides the following advantages.

Fewer operations are required to establish the secure communication channel. For example, the method of the present disclosure does not require any additional certificate exchanges. In addition, no additional public key cryptography signing operations are required and the number of cryptographic operations required are thus reduced. Furthermore, the present disclosure does not require the same certification authority for the initiator device and the endpoint device.

Once the secure communication channel is established, the initiator device and the endpoint device can connect in a secure manner. The secure communication channel provides the ability to perform secure wireless services. The services can also be accessed via a wired connection. It also ensures user privacy during the wireless service. A further advantage is that it provides integrity and conditional confidentiality of data exchanged between the initiator device and the endpoint device.

The mobile wallet of a mobile device is also able to manage wireless payments, value-added services, e.g. tipping, charity, loyalty and cloud services, e.g. storing and managing receipts or instant financing. The secure communication channel is available alongside the security of the EMV infrastructure, for example EMV payment cards and merchant card readers. Typically, a mobile wallet in a mobile device does not share any context with the EMV payment card that initiates a payment transaction. The present disclosure provides significant security advantages in establishing a secure communication channel between the mobile wallet and the payment terminal during an EMV transaction.

The method steps of the first aspect may be triggered by a payment transaction between a transaction device and the initiator device.

In embodiments, the communication channel may be established between the initiator device and the endpoint device via the intermediary server.

In embodiments, the communication channel may be established directly between the initiator device and the endpoint device.

In some embodiments, the handover token may have been shared with the intermediary server by the endpoint device prior to the method being performed. In other embodiments, the handover token may have been shared with the intermediary server by the endpoint device at the time of the method being performed.

The handover token may comprise a public key (QE) of an endpoint cryptographic key pair (dE, QE), comprising a private key (dE) and a public key (QE), which has been generated at the endpoint device. The method may further comprise receiving, from the intermediary server, the public key (QE); generating an initiator device cryptographic key pair (dI, QI), comprising a private key (dI) and a public key (QI); computing a shared secret (z) using the private key (dI) of the initiator device cryptographic key pair and the public key (QE) received from the intermediary server; deriving a session key (SK) from the shared secret (z); sending, to the endpoint device, the public key (QI) of the initiator device cryptographic key pair (dI, QI) for generation of the same session key (SK); and establishing, using the session key (SK), the secure channel between the initiator device and the endpoint device.

The handover token may comprise a secret key (K) which has been generated at the endpoint device. The method may further comprise receiving, from the intermediary server, the secret key (K); generating an initiator device cryptographic key pair (dI, QI), comprising a private key (dI) and a public key (QI); sending, to the endpoint device, the public key (QI) of the initiator device cryptographic key pair (dI, QI) for generation of the session key (SK); receiving, from the endpoint device, a public key (QE) of an endpoint cryptographic key pair (dE, QE), comprising a private key (dE) and a public key (QE), which has been generated at the endpoint device; computing a shared secret (z) using the private key (dI) of the initiator device cryptographic key pair and the public key (QE) received from the endpoint device; deriving a session key (SK) from the shared secret (z) using the secret key (K); and establishing, using the session key (SK), the communication channel between the initiator device and the endpoint device.

The initiator device may comprise a payment terminal, the endpoint device may comprise a mobile device, the intermediary server may comprise a service gateway, and the method may further comprise establishing, using the handover token, the communication channel between the payment terminal and the mobile device.

The mobile device and the payment terminal may be provisioned with transaction data, and the method may be performed during a payment transaction between a transaction device and the payment terminal.

The method may further comprise receiving, from the transaction device, the payment card identifier (PAN) upon initiation of the payment transaction; sending, to the service gateway, the payment card identifier (PAN) with a request for a handover token (HT), wherein the handover token (HT) corresponds to the mobile device associated to the payment card identifier (PAN); receiving, from the service gateway, the handover token (HT) corresponding to the mobile device associated to the payment card identifier (PAN); and establishing, using the received handover token (HT), the communication channel between the mobile device and the payment terminal.

Preferably, the communication channel is independent of communication means for the payment transaction.

The payment transaction may be an EMV payment transaction.

The EMV payment transaction may be performed using NFC technology.

The transaction device may be the mobile device and the mobile device may comprise a digitised version of a payment card.

The transaction device may comprise a payment card and the mobile device may comprise a digitised version of the payment card.

The EMV payment transaction may be performed by a contact-based EMV payment transaction. Contact-based EMV payment transactions may include chip-based transactions or magstripe.

The initiator device may comprise a payment terminal, the endpoint device may comprise a service provider, the intermediary server may comprise a platform gateway, and the method may comprise establishing, using the handover token, the communication channel between the payment terminal and the service provider.

The initiator device may comprise a mobile device, the endpoint device may comprise a service provider, the intermediary server may comprise a platform gateway, and the method may comprise establishing, using the handover token, the communication channel between the mobile device and the service provider.

According to a second aspect of the present disclosure, there is provided a computing device comprising a processor, a memory, and communication capability, wherein the computing device is adapted to perform the method of the first aspect.

According to a third aspect of the present disclosure, there is provided a computer program product comprising instructions which, when the program is executed by a computer, cause the computer to carry out the method of the first aspect.

According to a fourth aspect of the present disclosure, there is provided a computer-readable storage medium comprising instructions which, when executed by a computer, cause the computer to carry out the method of the first aspect.

According to a fifth aspect of the present disclosure, there is provided a computer-implemented method of establishing a communication channel for exchanging messages securely between an initiator device and an endpoint device using an intermediary server, wherein the initiator device is in communication with the intermediary server via a first session encrypted according to a cryptographic protocol, and the endpoint device is in communication with the intermediary server via a second session encrypted according to a cryptographic protocol, and wherein the method is performed at the intermediary server. The method comprises receiving, from the initiator device, a request for a handover token (HT), wherein the requested handover token (HT) comprises data that has been generated at the endpoint device and is configured to be used in setting up the communication channel between the initiator device and the endpoint device; and sending, to the initiator device, the handover token (HT) for establishing the communication channel between the initiator device and the endpoint device.

According to a sixth aspect of the present disclosure, there is provided an intermediary server adapted to perform the method of the fifth aspect.

According to a seventh aspect of the present disclosure, there is provided a computer program product comprising instructions which, when the program is executed by a computer, cause the computer to carry out the method of the fifth aspect.

According to an eighth aspect of the present disclosure, there is provided a computer-readable storage medium comprising instructions which, when executed by a computer, cause the computer to carry out the method of the fifth aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

DETAILED DESCRIPTION

The present disclosure relates to a computer-implemented method for establishing a communication channel for exchanging messages securely, also called a secure communication channel, between an initiator device and an endpoint device using an intermediary server. Aspects of the disclosure include a computing device adapted to perform the method as outlined in any of the disclosed embodiments. Further aspects of the disclosure include a computer program product and a computer-readable storage medium comprising instructions which cause a computer to perform the method as outlined in any of the disclosed embodiments.

It should be noted that the term 'communication channel', 'secure communication channel' and 'secure channel' may be used interchangeably throughout the specification. The terms 'physical card', 'payment card' and 'physical payment card' may also be used interchangeably throughout the specification.

The secure communication channel can be established between different entities. The term 'initiator device' represents the entity that initiates establishment of the secure communication channel and the term 'endpoint device' represents the entity with which the secure communication channel is established. For example, a secure communication channel may be established between a payment terminal (initiator device) and a mobile device (endpoint device). As another example, a secure communication channel may be established between a mobile device (initiator device) and a service provider (endpoint device). As a further example, a secure communication channel may be established between a payment terminal (initiator device) and a service provider (endpoint device).

The term mobile device may be used synonymously herein with 'mobile cellular telecommunications handset' or 'mobile phone' or 'smartphone'.

General and specific embodiments of the disclosure will be described below with reference to FIGS. 1 to 20.

Figure 1A:
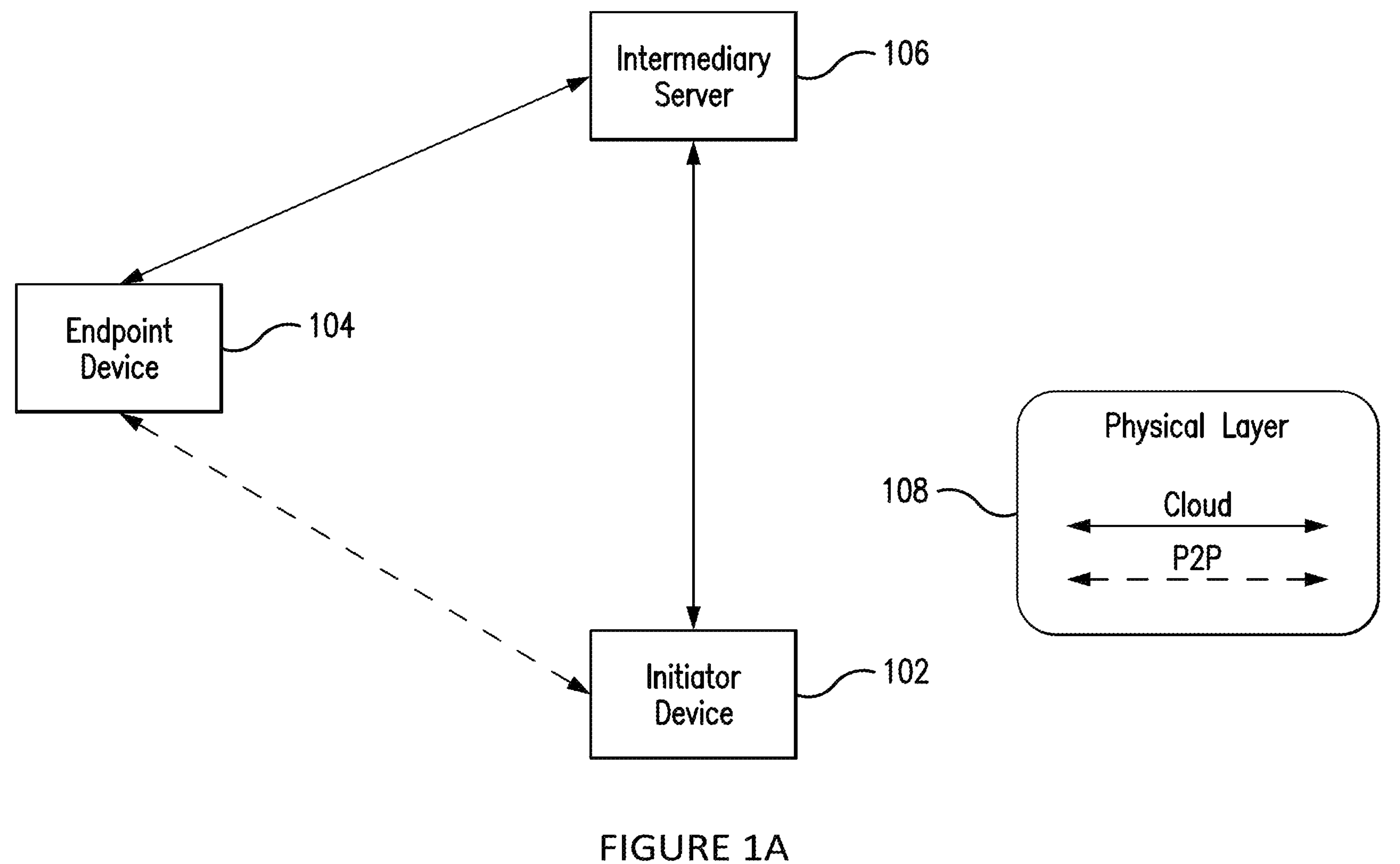
FIG. 1*a* is a schematic diagram showing an initiator device, an endpoint device and an intermediary server, and a physical layer connecting the three entities, in accordance with embodiments of the present disclosure.

FIG. 1*a* shows an initiator device 102, an endpoint device 104 and an intermediary server 106 in communication with one another where the communication is provided by a physical layer 108. The physical layer 108 comprises a cloud-based communication between the initiator device 102 and the intermediary server 106, between the endpoint device 104 and the intermediary server 106, and between the initiator device 102 and the endpoint device 104 via the intermediary server 106. The physical layer 108 also comprises a P2P communication between the initiator device 102 and the endpoint device 104.

Figure 1B:
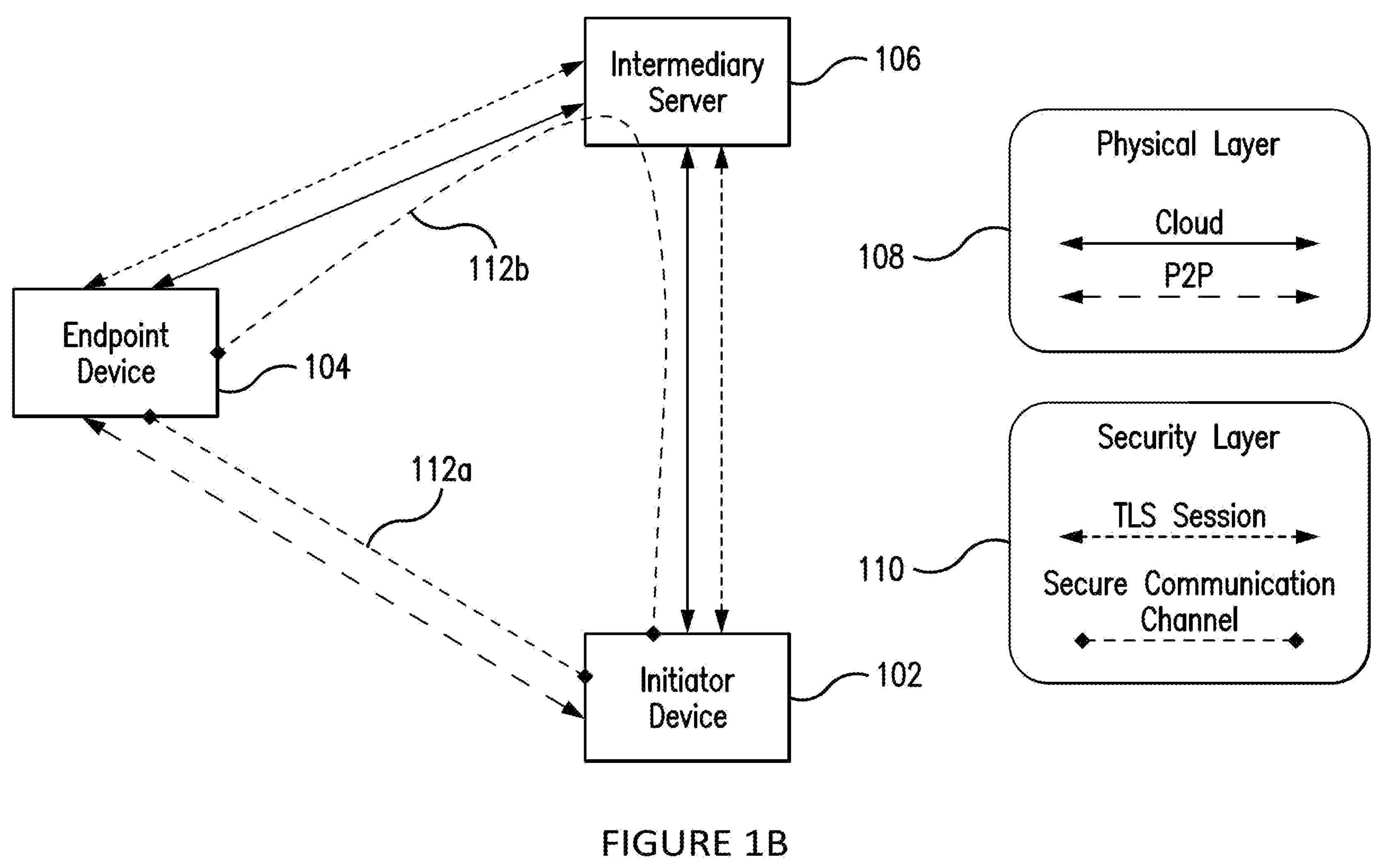
FIG. 1*b* is a schematic diagram showing the initiator device, the endpoint device and the intermediary server of FIG. 1*a*, alongside the physical layer shown in FIG. 1*a* and a security layer, wherein the security layer includes a secure communication channel between the initiator device and the endpoint device, in accordance with embodiments of the present disclosure.

The secure communication channel forms part of a security layer or security protocol which exists alongside the physical layer 108. Accordingly, FIG. 1*b* shows the initiator device 102, the endpoint device 104 and the intermediary server 106 with the security layer 110 in addition to the physical layer 108. The security layer 110 includes a secure communication channel 112*a*, 112*b* between the initiator device 102 and the endpoint device 104.

The security layer 110 further comprises a Transport Layer Security (TLS) protocol connection between the endpoint device 104 and the intermediary server 106, and between the initiator device 102 and the intermediary server 106. The TLS protocol based on public key cryptography enables the communications between these entities to be encrypted to prevent eavesdropping and tampering.

The secure communication channel 112*a*. 112*b* may comprise a wireless connection or a wired connection. The secure communication channel may be implemented directly between the initiator device 102 and the endpoint device 104, using a direct secure communication channel 112*a*. Alternatively, the secure communication channel may be implemented indirectly between the initiator device 102 and the endpoint device 104, using an indirect secure communication channel 112*b*. The intermediary server establishes the cloud-based connection between initiator device 102 and endpoint device 104. Both entities connect independently to the intermediary server using the same channel identifier (UUID), and the intermediary server connects the two entities using a conduit service that is provided in connection with the intermediary server.

The secure communication channel 112*a*, 112*b* enables messages to be exchanged securely between the initiator device 102 and an endpoint device 104, such that a wireless transaction can be performed.

Processes involved in establishing the secure communication channel 112*a*, 112*b* will now be described with reference to FIGS. 2 to 5, in accordance with embodiments of the present disclosure.

Figure 2:
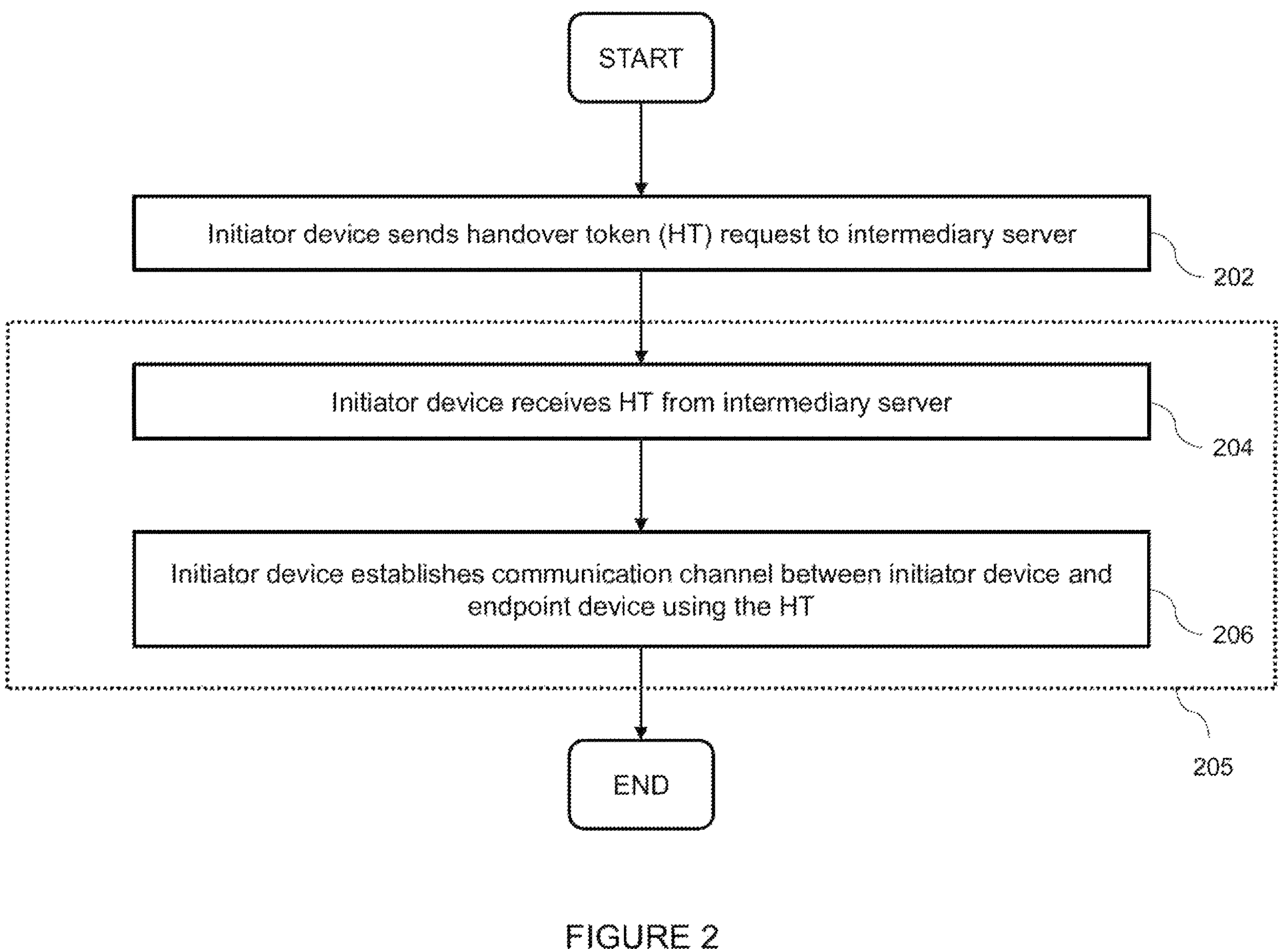
FIG. 2 is a flow chart showing a process, performed by the initiator device, of establishing the secure communication channel shown in FIG. 1*b*, in accordance with embodiments of the present disclosure.

FIG. 2 shows a method performed by the initiator device 102 in establishing the secure communication channel. Firstly, the initiator device 102 sends, at Step 202, a request for a handover token (HT) to the intermediary server 106. The handover token (HT) comprises data that has been generated at the endpoint device 104 and is configured to be used in setting up the secure communication channel between the initiator device 102 and the endpoint device 104. Next, the initiator device 102 receives, at Step 204, the handover token (HT) from the intermediary server 106. Then, the initiator device 102 establishes, at Step 206, using the handover token (HT), the secure communication channel between the initiator device 102 and the endpoint device 104. Steps 204 and 206, in combination referred to as Collective Step 205, are described in further detail below with reference to FIGS. 3 and 4.

Figure 3:
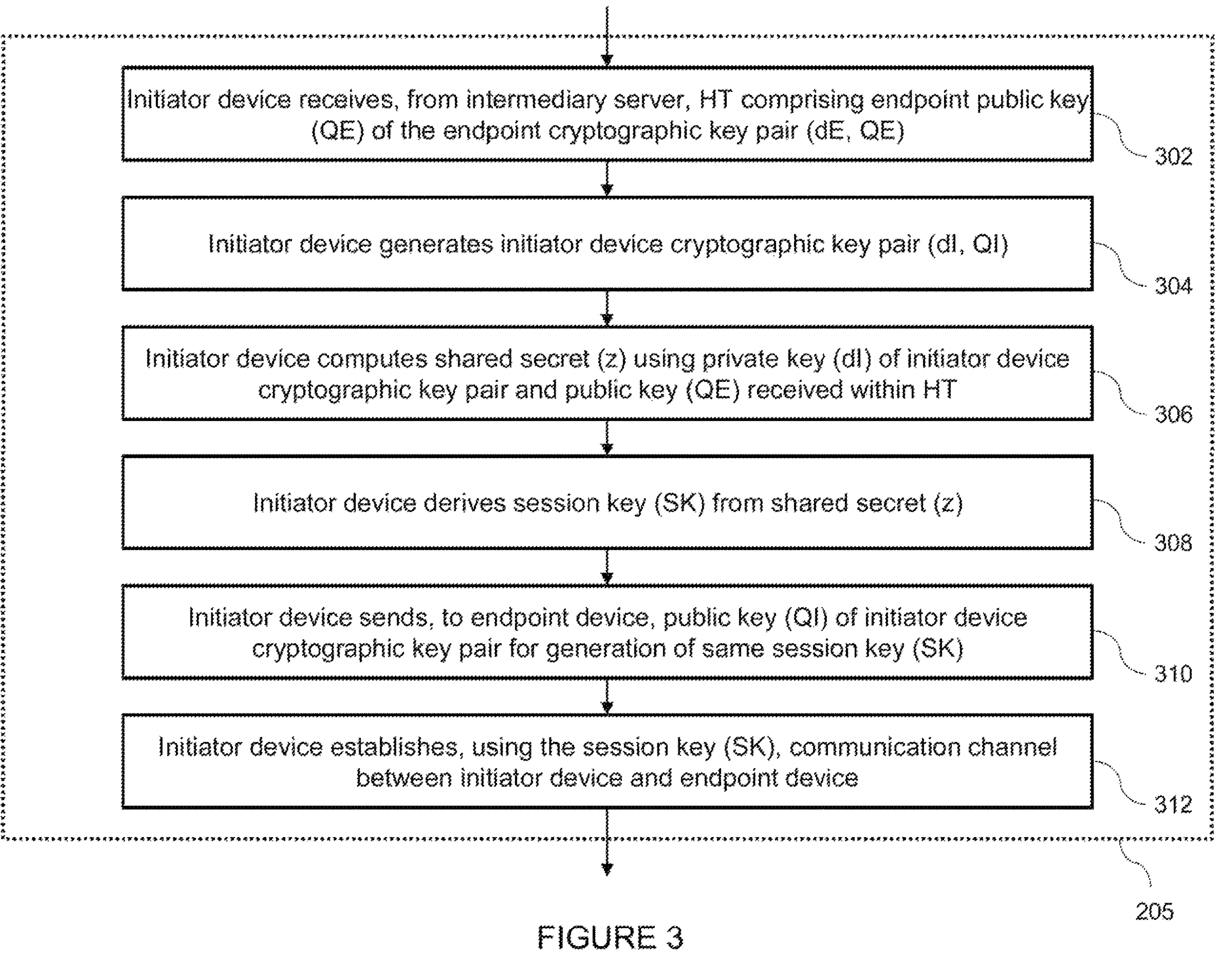
FIG. 3 is a flow chart showing the process, performed by the initiator device, of the receiving and establishing steps shown in FIG. 2 in further detail, for embodiments where the handover token (HT) comprises an endpoint public key (QE)

In FIG. 3, Collective Step 205 of the method performed by the initiator device 102 is shown in further detail for embodiments in which the handover token (HT) comprises an endpoint public key (QE), the endpoint public key (QE) being a public key which has been generated at the endpoint device 104. Collective Step 205 involves receiving the handover token (HT) from the intermediary server 106 and establishing a secure communication channel 112*a*, 112*b* between the initiator device 102 and the endpoint device 104 using the handover token (HT).

The initiator device 102 receives, at Step 302, the handover token (HT) from the intermediary server 106 whereby the handover token (HT) comprises a public key (QE), also called an endpoint public key (QE), of an endpoint cryptographic key pair (dE, QE). Step 302 thereby provides an example of Step 204 of FIG. 2. The endpoint cryptographic key pair (dE, QE) comprises a private key (dE) and a public key (QE). The endpoint cryptographic key pair (dE, QE) has been generated at the endpoint device 104.

The initiator device 102 generates, at Step 304, an initiator device cryptographic key pair (dI, QI), comprising a private key (dI) and a public key (QI). The initiator device then computes, at Step 306, a shared secret (z) using the private key (dI) of the initiator device cryptographic key pair and the public key (QE) received from the intermediary server 106. The initiator device 102 then derives, at Step 308, a session key (SK) from the shared secret (z).

Next, the initiator device 102 sends, at Step 310, the public key (QI) of the initiator device cryptographic key pair (dI, QI) to the endpoint device for generation of the same session key (SK). The initiator device 102 then establishes, at Step 312, using the session key (SK), the secure communication channel 112*a*, 112*b* between the initiator device 102 and the endpoint device 104. Step 312 thereby provides an example of Step 206 of FIG. 2.

Figure 4:
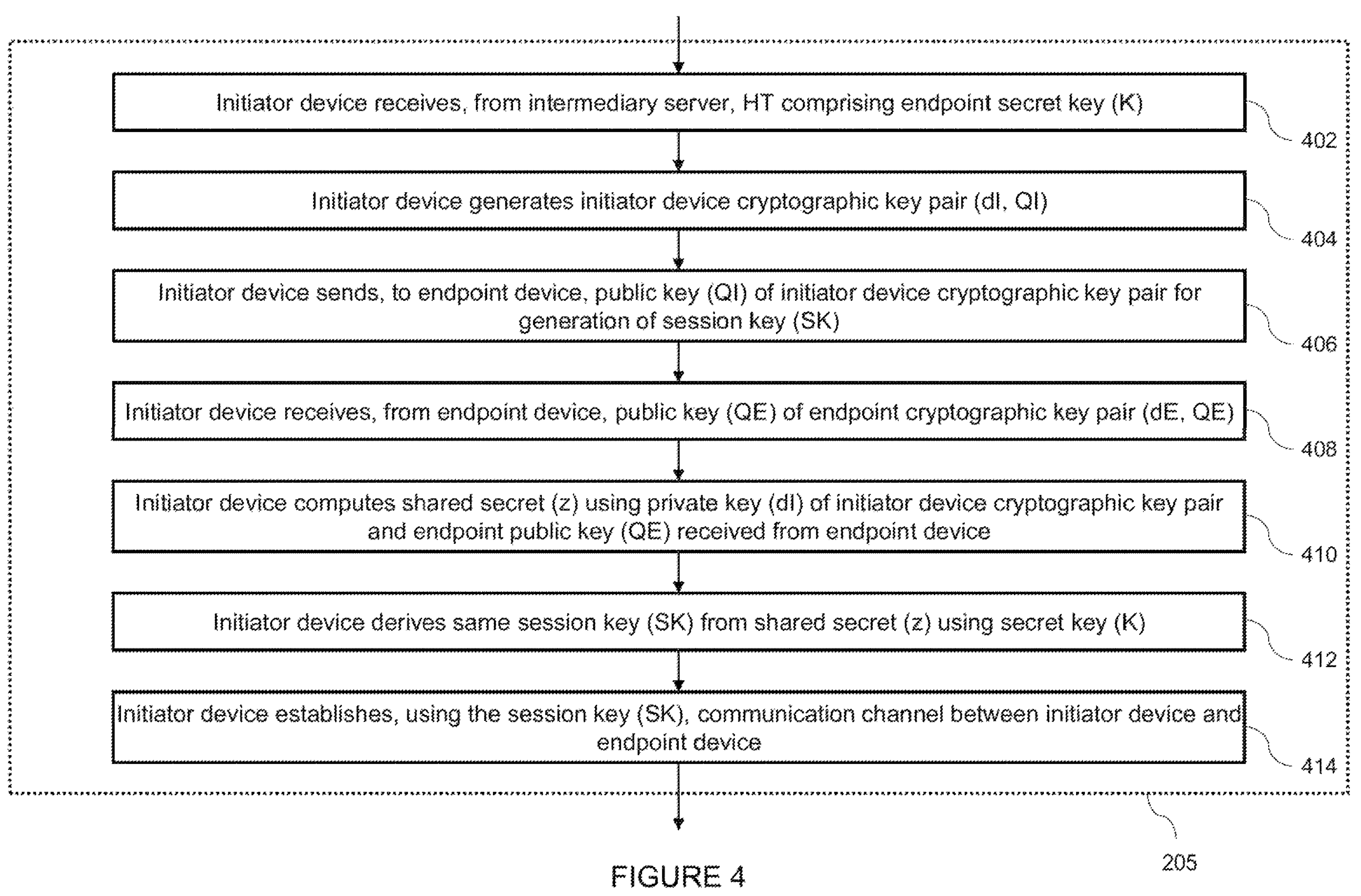
FIG. 4 is a flow chart showing the process, performed by the initiator device, of the receiving and establishing steps shown in FIG. 2 in further detail, for embodiments where the handover token (HT) comprises an endpoint secret key (K)

In FIG. 4, Collective Step 205 of the method performed by the initiator device 102 is shown in further detail for embodiments in which the handover token (HT) comprises an endpoint secret key (K). Collective Step 205 involves receiving the handover token (HT) from the intermediary server 106 and establishing a secure communication channel 112*a*, 112*b* between the initiator device 102 and the endpoint device 104 using the handover token (HT).

The initiator device 102 receives, at Step 402, the handover token (HT) from the intermediary server 106 whereby the handover token (HT) comprises a secret key (K) also called an endpoint secret key, which has been generated at the endpoint device 104.

The initiator device 102 generates, as Step 404, an initiator device cryptographic key pair (dI, QI), comprising a private key (dI) and a public key (QI). The initiator device 102 sends, at Step 406, the public key (QI) of the initiator device cryptographic key pair (dI, QI) to the endpoint device 104 for generation of the session key (SK). Next, the initiator device 102 receives, at Step 408, a public key (QE) of an endpoint cryptographic key pair (dE, QE) from the endpoint device 104, whereby the endpoint cryptographic key pair (dE, QE) comprises a private key (dE) and a public key (QE) and has been generated at the endpoint device 104.

Once the initiator device 102 has received the public key (QE), the initiator device 102 computes, at Step 410, a shared secret (z) using the private key (dI) of the initiator device cryptographic key pair and the public key (QE) received from the endpoint device 104. The initiator device 102 then derives, at Step 412, a session key (SK) from the shared secret (z) using the secret key (K). Once the initiator device 102 has derived the session key (SK), the initiator device 102 uses the session key (SK) to establish, at Step 414, the secure communication channel 112*a*, 112*b* between the initiator device 102 and the endpoint device 104.

Figure 5:
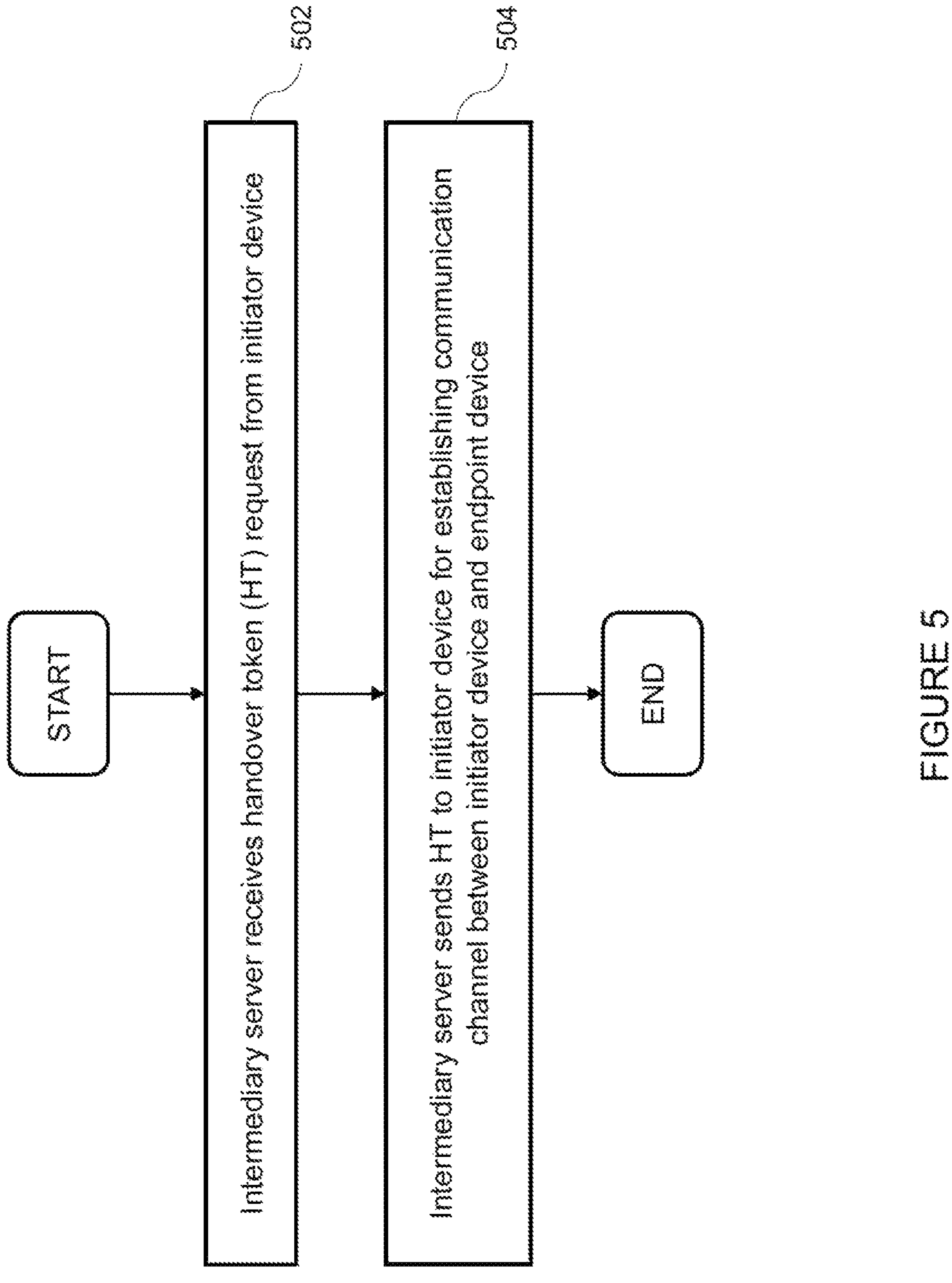
FIG. 5 is a flow chart showing a process, performed by the intermediary server, of establishing the secure communication channel shown in FIG. 1*b*, in accordance with embodiments of the present disclosure.

FIG. 5 shows a method performed by the intermediary server 106 in establishing the secure communication channel 112*a*, 112*b*. Firstly, the intermediary server 106 receives, at Step 502, a request for a handover token (HT) from the initiator device 102. The requested handover token (HT) comprises data that has been generated at the endpoint device 104 and is configured to be used in setting up the secure communication channel 112*a*. 112*b* between the initiator device 102 and the endpoint device 104. Next, the intermediary server 106 sends, at Step 504, the handover token (HT) to the initiator device 102 for establishing the secure communication channel 112*a*, 112*b* between the initiator device 102 and the endpoint device 104.

The security of the secure communication channel 112*a*, 112*b* is thus based on a novel security using ECDHE with the above described Handover Token mechanisms.

Specific embodiments of the disclosure will now be described with reference to FIGS. 6 to 20.

FIGS. 6 to 14, along with the accompanying description below, illustrate embodiments of the disclosure involving establishment of a secure communication channel between a payment terminal and a mobile device.

The mobile device may be a smartphone or another type of mobile computing device such as a tablet or a connected watch. The mobile computing device has cellular telecommunications capabilities along with some other form of wireless data connection, such as a Wi-Fi or Bluetooth connection. In general, a mobile device comprising the following hardware elements are suitable for use with embodiments of the present disclosure. The mobile device may have a display providing, for example, a touchscreen user interface. The mobile device may be equipped with a remote wireless telecommunications apparatus comprising a remote transmitter/receiver for communication with a wireless telecommunications network. The mobile device may also equip with a local wireless telecommunications apparatus comprising a local transmitter/receiver for communication with a local transaction device such as a payment terminal. For example, the local transmitter/receiver may comprise an NFC receiver and an NFC transmitter for receiving and transmitting data to and from the mobile device to a local device. The mobile device further comprises a processor and a memory device.

Figure 6:
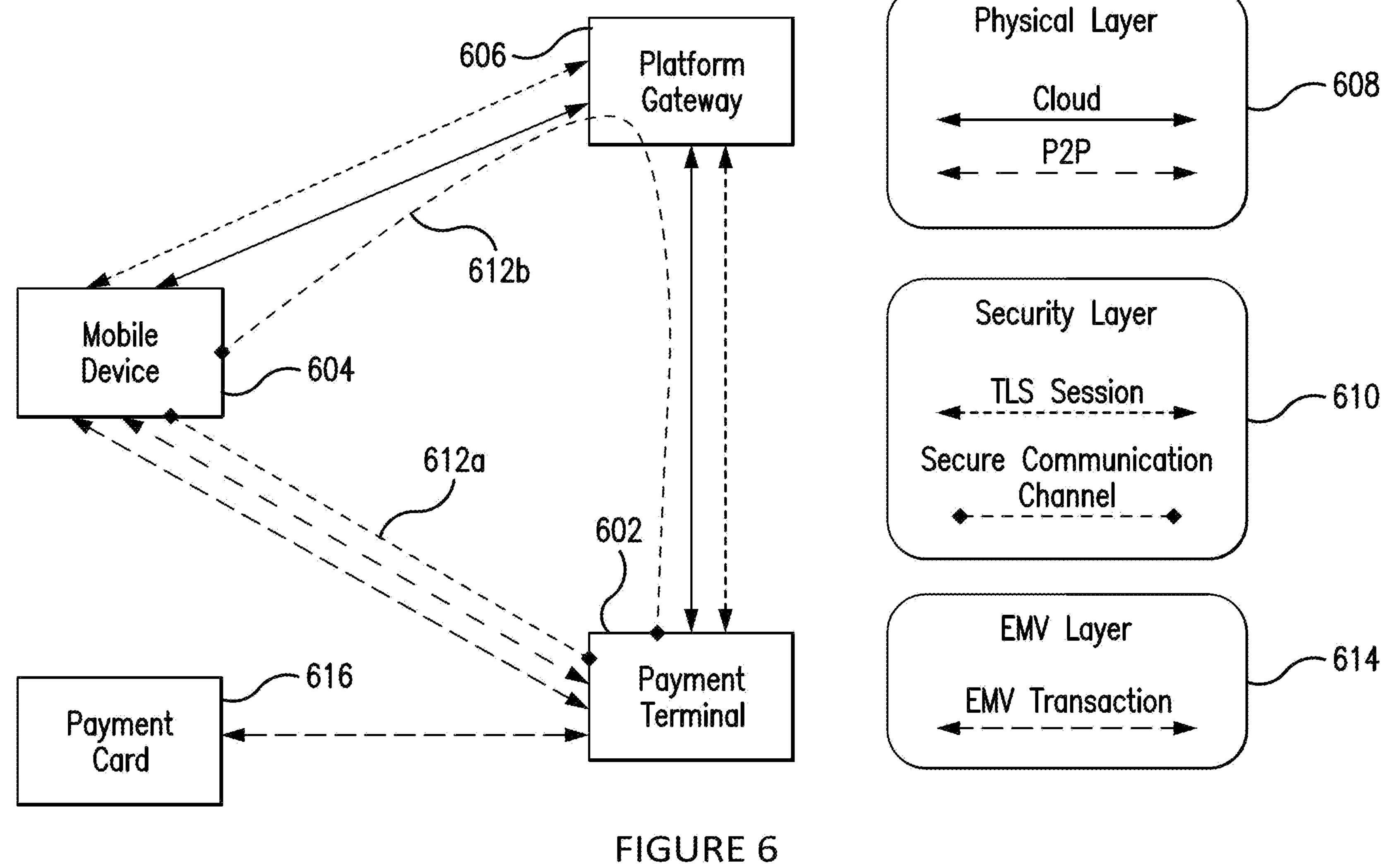
FIG. 6 is a schematic diagram showing a payment terminal, a mobile device, a platform gateway, alongside a physical layer and a security layer connecting the three entities, and EMV channels between the payment terminal and available EMV devices, wherein the security layer includes a secure communication channel between the payment terminal and the mobile device, in accordance with a first embodiment of the present disclosure.

A payment terminal 602, a mobile device 604 and a platform gateway 606 are used as examples of the initiator device 102, the endpoint device 104 and the intermediary server 106, respectively. As shown in FIG. 6, a physical layer 608 connects the three entities 602, 604, 606. The physical layer 608 comprises cloud-based communications between the payment terminal 602 and the platform gateway 606, and between the mobile device 604 and the platform gateway 606. The physical layer 608 also comprises a P2P communication between the payment terminal 602 and the mobile device 604.

The system shown in FIG. 6 further comprises a security layer 610. The security layer 610 includes a secure communication channel 612*a*, 612*b* between the payment terminal 602 and the mobile device 604.

The secure communication channel 612*a*, 612*b* enables messages to be exchanged securely between the payment terminal 602 and the mobile device 604. The secure communication channel 612*a*, 612*b* may comprise a wireless connection or a wired connection. The path of the secure communication channel may incorporate different connection types, e.g. a wired connection and a wireless connection. For example, a wired connection may be used between the payment terminal 602 and the platform gateway 606 as part of the secure communication channel 612*b*, whilst a wireless connection may be used between the mobile device 604 and the platform gateway 606.

The secure communication channel may be implemented directly between the payment terminal 602 and the mobile device 604, using a direct secure communication channel 612*a*. Alternatively, the secure communication channel may be implemented indirectly between the payment terminal 602 and the mobile device 604, using an indirect secure communication channel 612*b*. The platform gateway 606 establishes the cloud-based connection between payment terminal 602 and mobile device 604. Both entities connect independently to the platform gateway 606 using the same channel identifier (UUID), and the platform gateway 606 connects the two entities using a conduit service (see FIG. 7).

For example, data may transmit between the payment terminal 602 and the mobile device 604; however, the data is kept private and the platform gateway 606 is unable to access this data as it is exchanged through a secure communication channel. The secure communication channel may include a cloud-based communication channel, e.g. using a conduit service at the TnC Platform.

The security layer 610 further comprises a Transport Layer Security (TLS) protocol connection between the mobile device 604 and the platform gateway 606, and between the payment terminal 602 and the platform gateway 606. The TLS protocol enables the communications between these entities to be encrypted to prevent eavesdropping and tampering.

The system shown in FIG. 6 further comprises an EMV layer 614. A transaction device, such as the mobile device 604 or a physical payment card 616, can be used to initiate a payment transaction with the payment terminal 602. The EMV layer 614 includes an EMV channel between the payment terminal 602 and the mobile device 604, for initiating a payment transaction using the mobile device 604. Alternatively, the EMV layer 614 includes an EMV channel between the payment terminal 602 and the payment card 616, for initiating a payment transaction using the payment card 616.

The secure communication channel 612*a*, 612*b* provides the following advantages. Once the secure communication channel 612*a*, 612*b* is established, the payment terminal 602 and the mobile device 604 are able to connect in a secure manner. This provides the ability to perform secure wireless payment transactions and secure wireless services. The security of wireless payment transactions and services is independent from the EMV transaction based on issuer keys. A further advantage is that the entities accessing the platform gateway, namely the payment terminal 602 and the mobile device 604, can be authenticated as part of the TLS session. The system also ensures user privacy during the wireless transactions and services, as well as user privacy when accessing a cloud service. A further advantage is that it provides integrity and conditional confidentiality of data exchanged between the payment terminal 602 and the mobile device 604.

Figure 7:
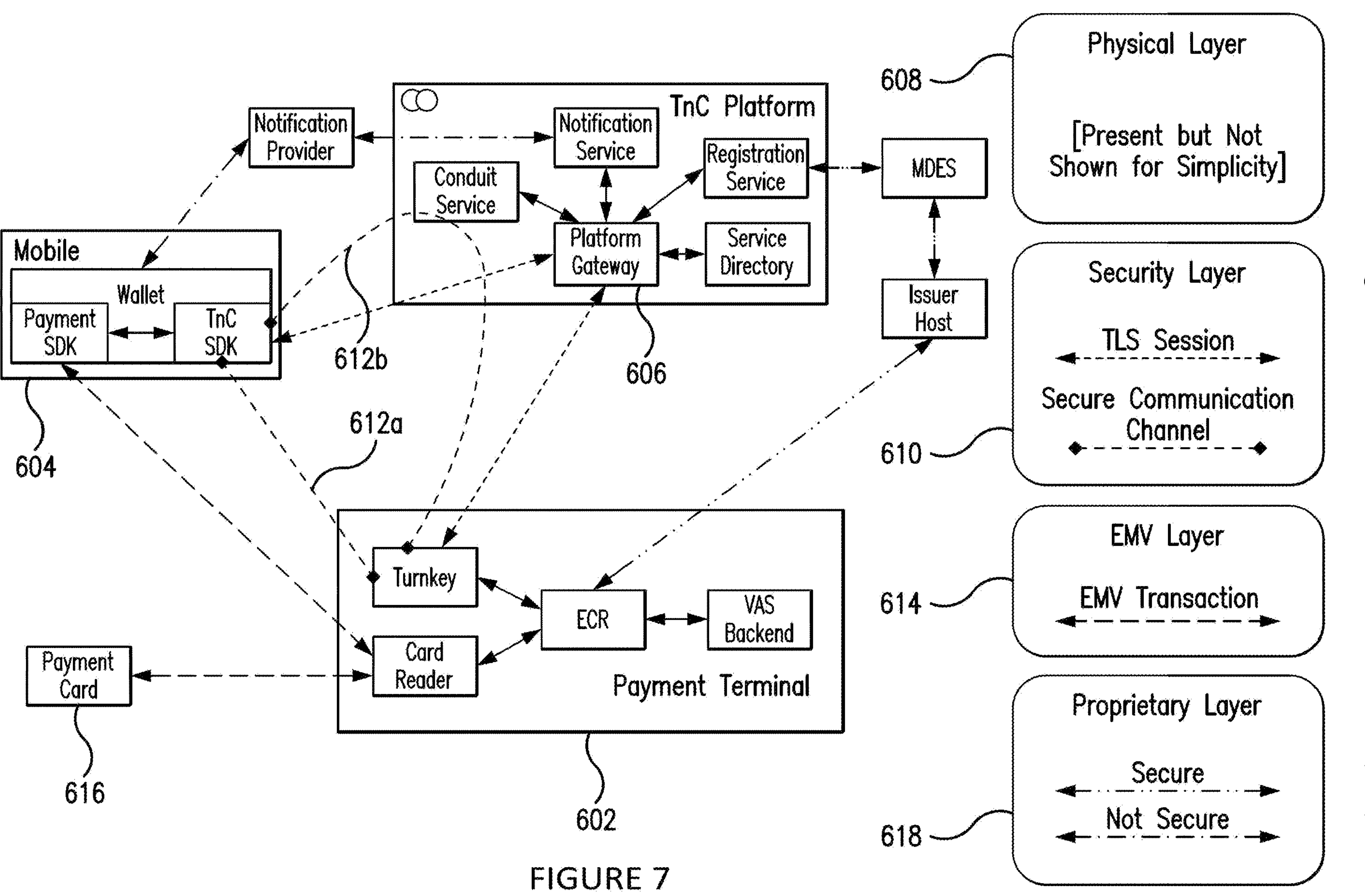
FIG. 7 is a schematic diagram showing components of the payment terminal, the mobile device and the TnC platform including the platform gateway shown in FIG. 6, and the corresponding layers of interaction, in accordance with the first embodiment.

FIG. 7 shows relevant components of the payment terminal 602, the mobile device 604 and the platform gateway 606 as well as the above-described interactions in further detail.

Starting with the payment terminal 602, the payment terminal 602 comprises a turnkey (the turnkey handles the wireless transaction at the payment terminal 602), a card reader, an electronic cash register (ECR) and a value-added services (VAS) backend. The mobile device 604 comprises a mobile wallet, which itself includes a payment SDK and a 'Tap and Connect' (TnC) SDK. The platform gateway 606 is provided as part of a TnC platform. The TnC platform comprises a conduit service, a notification service, a registration service and a service directory, all of which are in communication with the platform gateway 606.

The physical layer 608 is shown as present in the system architecture of FIG. 7, however it is omitted from the diagram for the sake of simplicity. As described above with respect to FIG. 6, the physical layer 608 comprises cloud-based communications between the payment terminal 602 and the platform gateway 606, and between the mobile device 604 and the platform gateway 606. More specifically, the physical layer 608 comprises cloud-based communications between the ECR of the payment terminal 602 and the platform gateway 606, and between the turkey of the payment terminal 602 and the platform gateway 606. Furthermore, the physical layer 608 comprises a cloud-based communication between the TnC SDK of the mobile device 604 and the platform gateway 606.

The physical layer also comprises a P2P communication between the payment terminal 602 and the mobile device 604. More specifically, the physical layer 608 comprises a P2P communication between the turnkey of the payment terminal 602 and the TnC SDK of the mobile device 604.

As can be seen in FIG. 7, the secure communication channel 612*a*, 612*b*, which is part of the security layer 610, is established between the turnkey of the payment terminal 602 and the TnC SDK of the mobile device 604. The indirect secure communication channel 612*b* is established via the conduit service of the TnC platform.

Transport Layer Security (TLS) protocol connections, which are also part of the security layer 610, are established between the TnC SDK of the mobile device 604 and the platform gateway 606, and between the turnkey of the payment terminal 602 and the platform gateway 606. The TLS protocol connections enable the communications between these entities to be encrypted to prevent eavesdropping and tampering.

The mobile device 604 and the payment card 616 are shown as examples of transaction devices in FIG. 7. Transaction devices can be used to initiate a payment transaction with the payment terminal 602. The EMV layer 614 includes an EMV channel between the card reader of the payment terminal 602 and the payment SDK of the mobile device 604, for initiating a payment transaction using the mobile device 604. The EMV layer 614 also includes an EMV channel between the card reader of the payment terminal 602 and the payment card 616, for initiating a payment transaction using the payment card 616.

The payment card 616 is capable of performing both contact-based and contactless payment transactions. The payment card 616 comprises a chip for storing card data. The chip is an EMV payment chip and is thereby associated with the EMV chip specifications. The EMV payment chip provides the ability to store confidential information securely, perform processing functions and perform cryptographic processing. The EMV payment chip has installed therein a set of payment card credential data for an account associated with the payment card. The credential data can include, for example, the primary account number, expiration date, and cardholder name, but may extend beyond this to cryptographic keys obtained directly or indirectly from a card issuer and associated with the user account. The chip also has a payment application installed therein, the payment application being adapted to use the credential data.

In order to initiate the transaction, the payment card 616 interacts with the card reader of the payment terminal 602 using the EMV channel between the card reader of the payment terminal 602 and the payment card 616. The card reader is configured to read the card data from the chip of the payment card 616. The card data can be read from the payment card 616 in a contactless manner, namely by bringing the payment card 616 into close proximity with the card reader of the payment terminal 602. The payment card 616 further comprises an antenna and NFC capability for enabling a contactless connection with the card reader. The card data and details of the transaction are then sent to the issuer to authorize the transaction. Alternatively, the card data can be read from the payment card in a contact-based manner, namely by inserting the payment card into the card reader and reading the card data from the chip (It is noted that whereas contactless transactions are performed with the card reader, wireless transactions are performed with the turnkey). In embodiments where the payment card 616 is used as the transaction device, the mobile device 604 comprises a digitised version of this payment card 604.

The mobile device 604 as the transaction device is capable of performing contactless payment transactions. The card data is stored within the payment SDK as part of a digitised version of a payment card. The mobile device 604, therefore, comprises a digitised version of the payment card. In order to initiate the transaction, the mobile device 604 interacts with the card reader of the payment terminal 602 using the EMV channel between the card reader of the payment terminal 602 and the payment SDK of the mobile device 604. The card reader is configured to read the card data from the payment SDK of the mobile device 604. The card data is read from the payment SDK of the mobile device 604 in a contactless manner, namely by bringing the mobile device 604 into close proximity with the card reader of the payment terminal 602. The mobile device 604 comprises an antenna and NFC capability for enabling a contactless connection with the card reader. The card data and details of the transaction are then sent to the issuer to authorize the transaction.

In some embodiments, a third-party wallet comprised within the mobile device 604 may be used to initiate the transaction, where the mobile device 604 is the transaction device. The third-party wallet is a separate entity to the mobile wallet. The third-party wallet may be, for example, a wallet that is provided by a third-party service provider and enables a user to instigate a payment transaction. In this case, the third-party wallet comprises a first digitised version of a payment card for use in the payment transaction. The mobile wallet, which comprises the payment SDK of the mobile device 604, comprises a second digitised version of the payment card. The card data is thus stored within the payment SDK as part of the second digitised version of the payment card. In order to initiate the transaction, the mobile device 604 interacts with the card reader of the payment terminal 602 using the EMV channel between the card reader of the payment terminal 602 and the third-party wallet of the mobile device 604. The card reader is configured to read the card data from the third-party wallet, which is stored within the third-party wallet as part of the first digitised version of the payment card, of the mobile device 604. The card data is read from the third-party wallet of the mobile device 604 in a contactless manner, namely by bringing the mobile device 604 into close proximity with the card reader of the payment terminal 602. The mobile device 604 comprises an antenna and NFC capability for enabling a contactless connection with the card reader. The card data and details of the transaction are then sent to the issuer to authorize the transaction.

Additional interactions between entities shown in FIG. 7 will now be described. The system further comprises a proprietary layer 618. The proprietary layer 618 includes secure proprietary communication protocols and non-secure proprietary communication protocols. The notification service of the TnC platform is in communication with the mobile wallet of the mobile device 604 via a notification provider, using a proprietary (non-secure) protocol. The registration service of the TnC platform is in communication with a digital enablement service (MDES) for supporting mobile payments, which is in turn in communication with an issuer, both via a secure proprietary protocol. The issuer is in turn communicative with the ECR of the payment terminal 602, via a secure proprietary protocol.

Although not shown in FIG. 7, the conduit service of the TnC platform may be in communication with the TnC SDK of the mobile device 604 and with the Turnkey of the payment terminal 602, using a cloud-based connection.

The secure communication channel 612*a*, 612*b* is triggered by a payment transaction between the transaction device (mobile device 604 or payment card 616) and the payment terminal 602. The process of establishing the secure communication channel 612*a*. 612*b* triggered by a payment transaction will now be described with reference to FIGS. 8 to 11.

Figure 8:
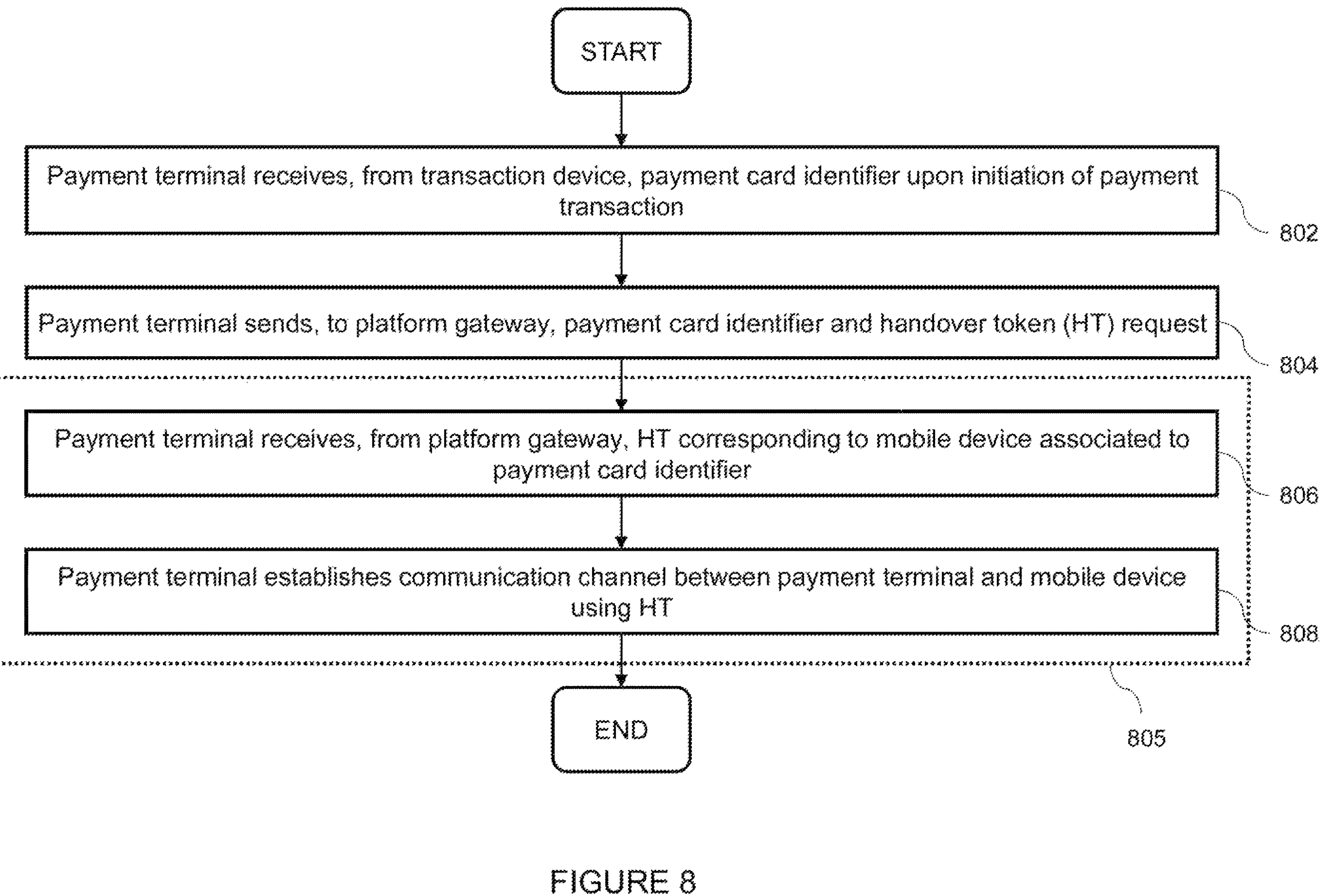
FIG. 8 is a flow chart showing a process, performed by the payment terminal, of establishing the secure communication channel shown in FIG. 6, in accordance with the first embodiment.

FIG. 8 shows the process performed by the payment terminal 602. Firstly, the payment terminal 602 receives, at Step 802, the payment card identifier (Primary Account Number or PAN), upon initiation of the payment transaction, from the transaction device 604, 616. The payment transaction may be initiated as set out above with reference to FIG. 7. The payment terminal 602 then sends, at Step 804, the payment card identifier (PAN) to the platform gateway 606 with a request for a handover token (HT). The requested handover token (HT) corresponds to the mobile device 604 associated to the payment card identifier (PAN). The payment terminal 602 then receives, at Step 806, the handover token (HT) from the platform gateway 606. The received handover token (HT) corresponds to the mobile device 604 that is associated to the payment card identifier (PAN). Lastly, the payment terminal 602 establishes, at Step 808, using the received handover token (HT), the secure communication channel between the mobile device 604 and the payment terminal 602. Steps 806 and 808, in combination referred to as Collective Step 805, are described in further detail below with reference to FIGS. 9 and 10.

Figure 9:
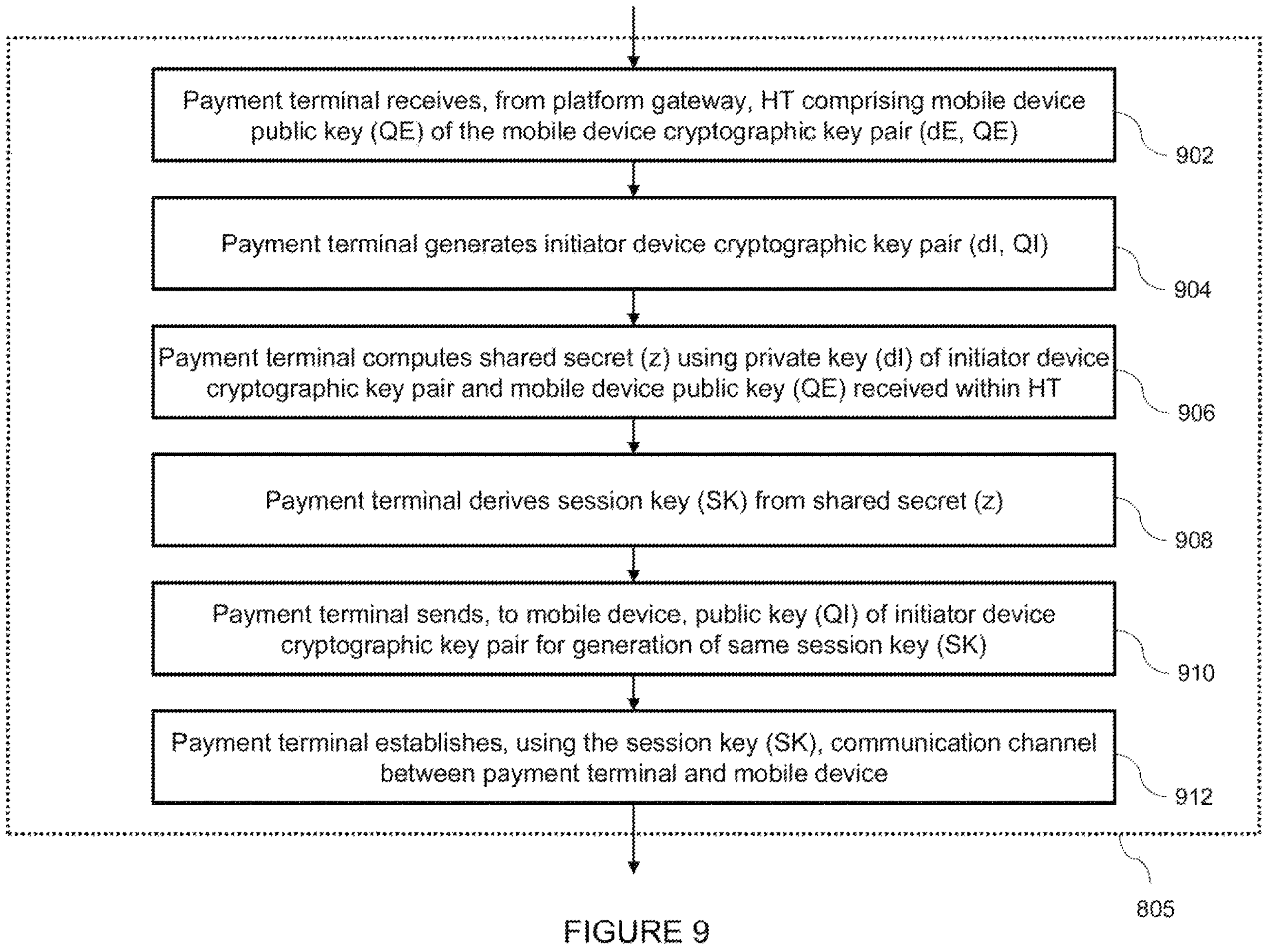
FIG. 9 is a flow chart showing the process, performed by the payment terminal, of the receiving and establishing steps shown in FIG. 8 in further detail, for embodiments where the handover token (HT) comprises a mobile device public key (QE)

In FIG. 9, Collective Step 805 of the method performed by the payment terminal 602 is shown in further detail for embodiments in which the handover token (HT) comprises a mobile device public key (QE). Collective Step 805 involves receiving the handover token (HT) from the platform gateway 606 and establishing a secure communication channel 612*a*. 612*b* between the payment terminal 602 and the mobile device 604 using the handover token (HT).

The payment terminal 602 receives, at Step 902, the handover token (HT) from the platform gateway 606 whereby the handover token (HT) comprises a public key (QE), also called a mobile device public key (QE), of a mobile device cryptographic key pair (dE, QE). The mobile device cryptographic key pair (dE, QE) comprises a private key (dE) and a public key (QE), which has been generated at the mobile device 604.

The payment terminal 602 generates, at Step 904, an initiator device cryptographic key pair (dI, QI), comprising a private key (dI) and a public key (QI). The payment terminal 602 then computes, at Step 906, a shared secret (z) using the private key (dI) of the initiator device cryptographic key pair and the public key (QE) received from the platform gateway 606. The payment terminal 602 then derives, at Step 908, a session key (SK) from the shared secret (z).

Next, the payment terminal 602 sends, at Step 910, the public key (QI) of the initiator device cryptographic key pair (dI, QI) to the mobile device 604 for generation of the same session key (SK). The payment terminal 602 then establishes, at Step 912, using the session key (SK), the secure communication channel 612*a*, 612*b* between the payment terminal 602 and the mobile device 604.

Figure 10:
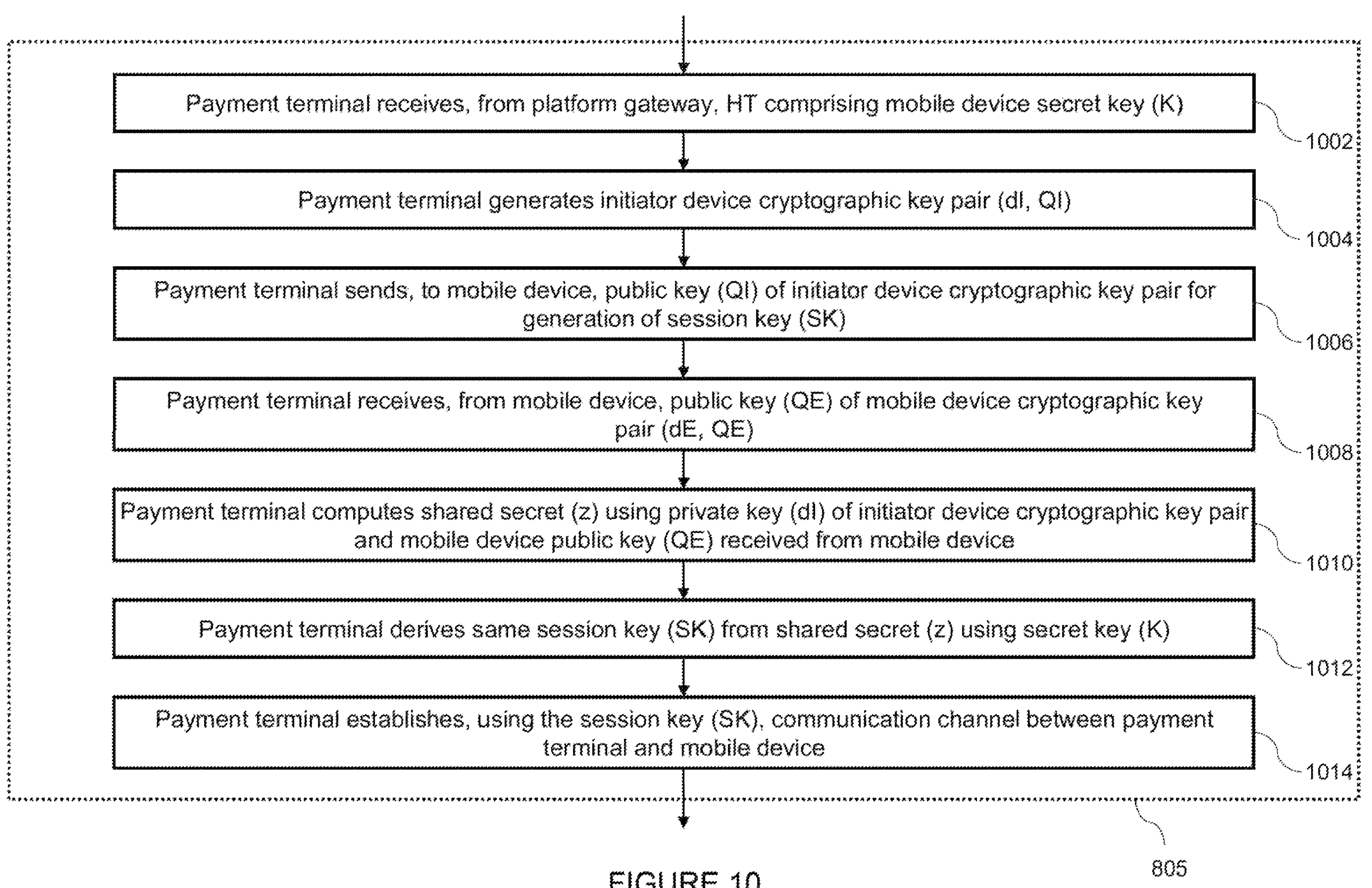
FIG. 10 is a flow chart showing the process, performed by the payment terminal, of the receiving and establishing steps shown in FIG. 8 in further detail, for embodiments where the handover token (HT) comprises a mobile device secret key (K)

In FIG. 10, Collective Step 805 of the method performed by the payment terminal 602 is shown in further detail for embodiments in which the handover token (HT) comprises a mobile device secret key (K). Collective Step 805 involves receiving the handover token (HT) from the platform gateway 604 and establishing a secure communication channel

612*a*, 612*b* between the payment terminal 602 and the mobile device 604 using the handover token (HT).

The payment terminal 602 receives, at Step 1002, the handover token (HT) from the platform gateway 606 whereby the handover token (HT) comprises a secret key (K) also called a mobile device secret key, which has been generated at the mobile device 604.

The payment terminal 602 generates, as Step 1004, an initiator device cryptographic key pair (dI, QI), comprising a private key (dI) and a public key (QI). The payment terminal 602 then sends, at Step 1006, the public key (QI) of the initiator device cryptographic key pair (dI, QI) to the mobile device 604 for generation of the session key (SK). Next, the payment terminal 602 receives, at Step 1008, a public key (QE) of a mobile device cryptographic key pair (dE, QE) from the mobile device 604, whereby the mobile device cryptographic key pair (dE, QE) comprises a private key (dE) and a public key (QE) and has been generated at the mobile device 604.

Once the payment terminal 602 has received the public key (QE), the payment terminal 602 computes, at Step 1010, a shared secret (z) using the private key (dI) of the initiator device cryptographic key pair and the public key (QE) received from the mobile device 604. The payment terminal 602 then derives, at Step 1012, a session key (SK) from the shared secret (z) using the secret key (K). Once the payment terminal 602 has derived the session key (SK), the payment terminal 602 uses the session key (SK) to establish, at Step 1014, the secure communication channel 612*a*. 612*b* between the payment terminal 602 and the mobile device 604.

Figure 11:
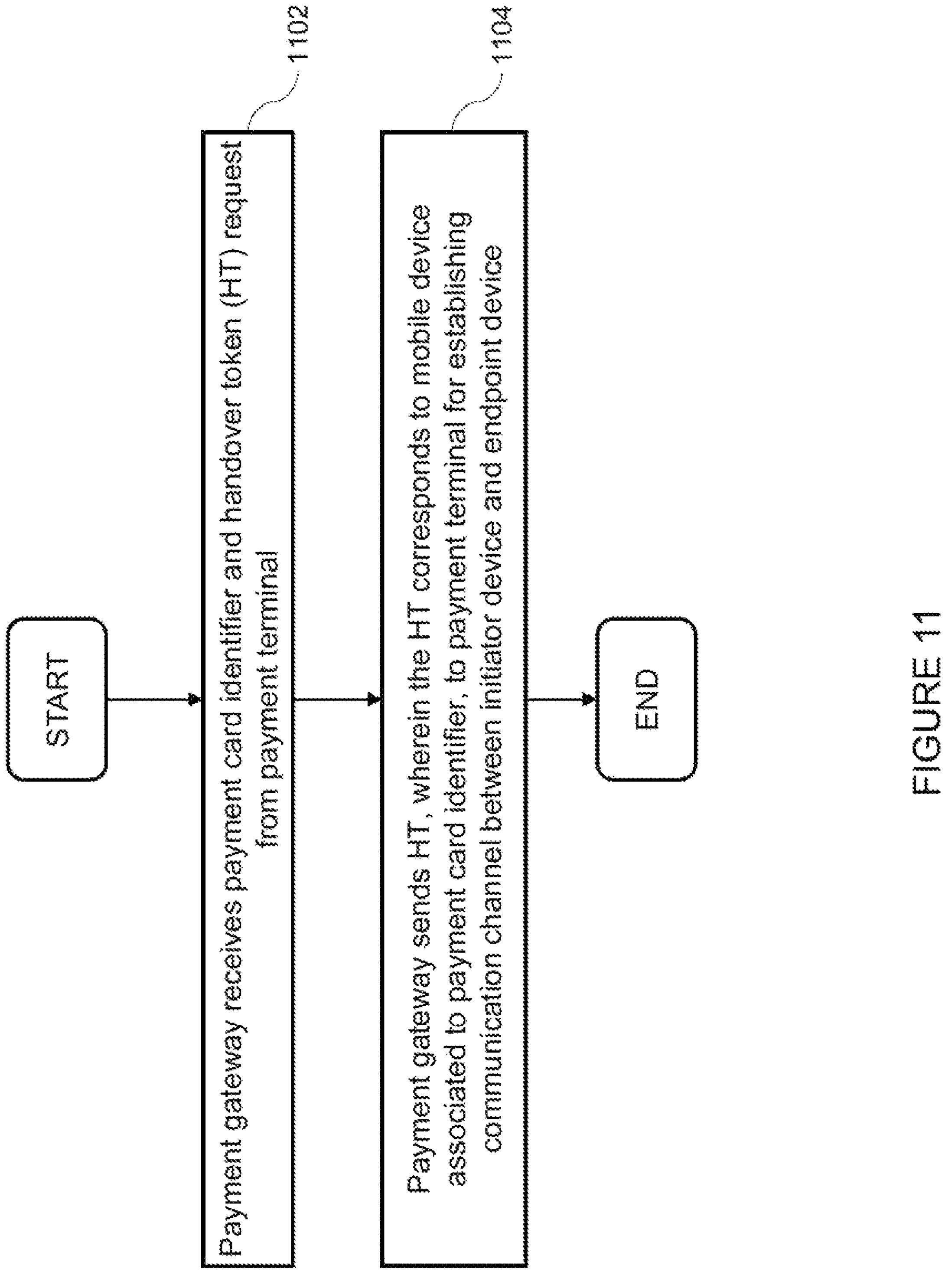
FIG. 11 is a flow chart showing a process, performed by the platform gateway, of establishing the secure communication channel shown in FIG. 6, in correspondence with the first embodiment.

FIG. 11 shows a method performed by the platform gateway 606 in establishing the secure communication channel 612*a*, 612*b*. Firstly, the platform gateway 606 receives, at Step 1102, a request for a handover token (HT) from the payment terminal 602. The requested handover token (HT) comprises data that has been generated at the mobile device 604 and is configured to be used in setting up the secure communication channel 612*a*. 612*b* between the payment terminal 602 and the mobile device 604. Next, the platform gateway 606 sends, at Step 1104, the handover token (HT) to the payment terminal 602 for establishing the secure communication channel 612*a*, 612*b* between the payment terminal 602 and the mobile device 604.

Figure 12:
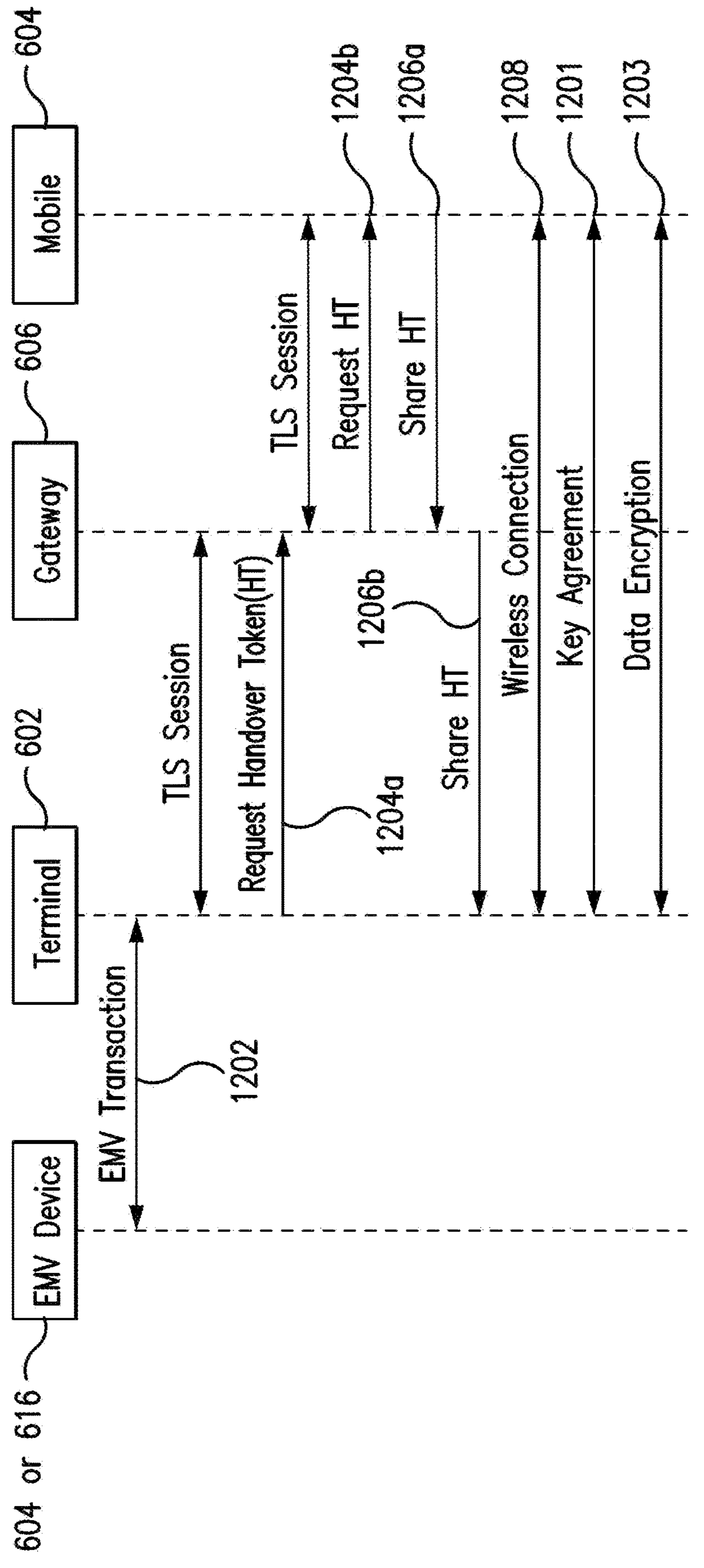
FIG. 12 is a sequence diagram showing the events occurring between the EMV device, the payment terminal, the platform gateway and the mobile device in establishing the secure communication channel shown in FIGS. 6 and 7, in accordance with the first embodiment.
Figure 13:
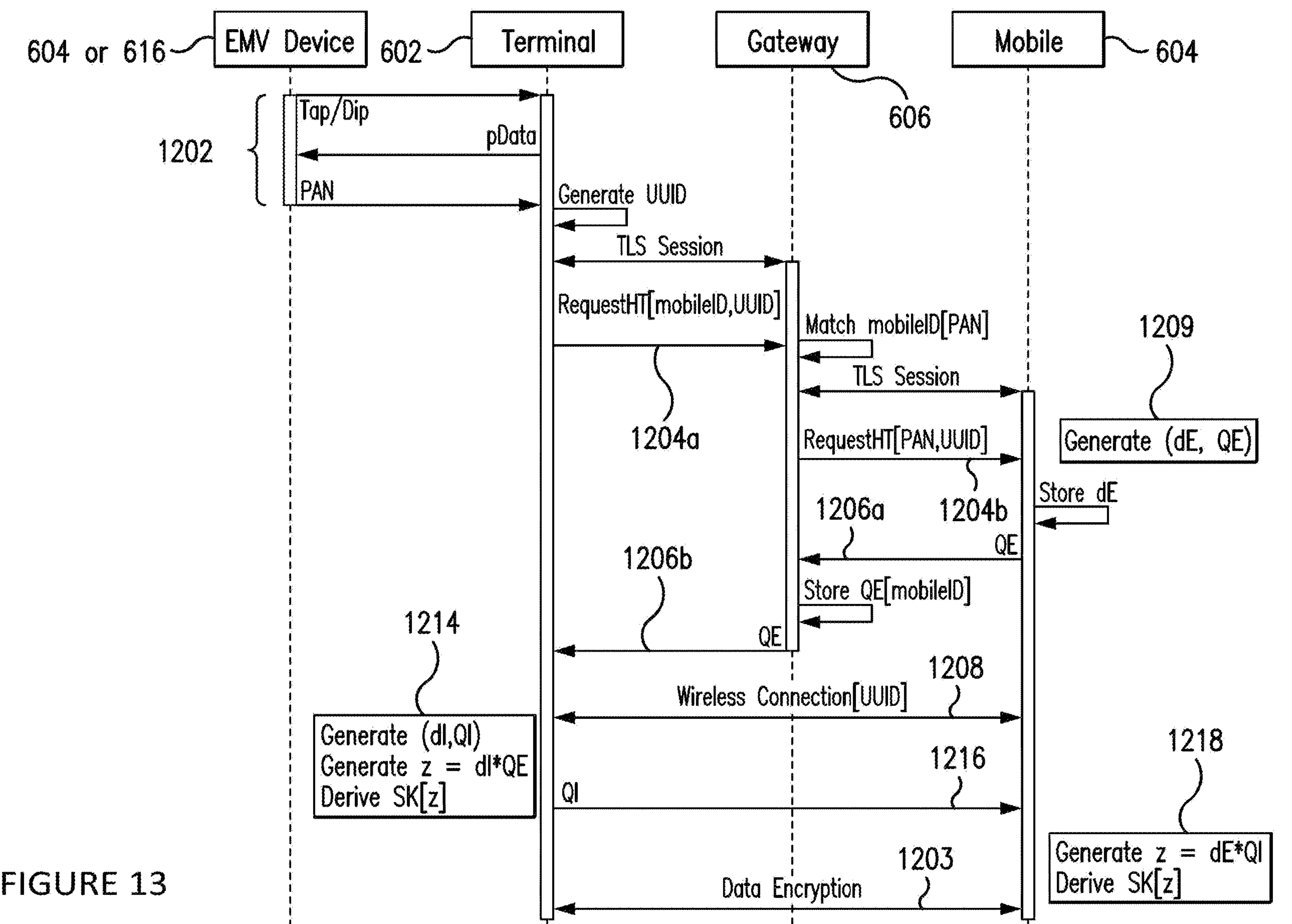
FIG. 13 is a sequence diagram showing the events occurring between the payment terminal, the platform gateway and the mobile device in establishing the secure communication channel shown in FIGS. 6 and 7, for embodiments in which the handover token (HT) comprises an endpoint public key (QE)
Figure 14:
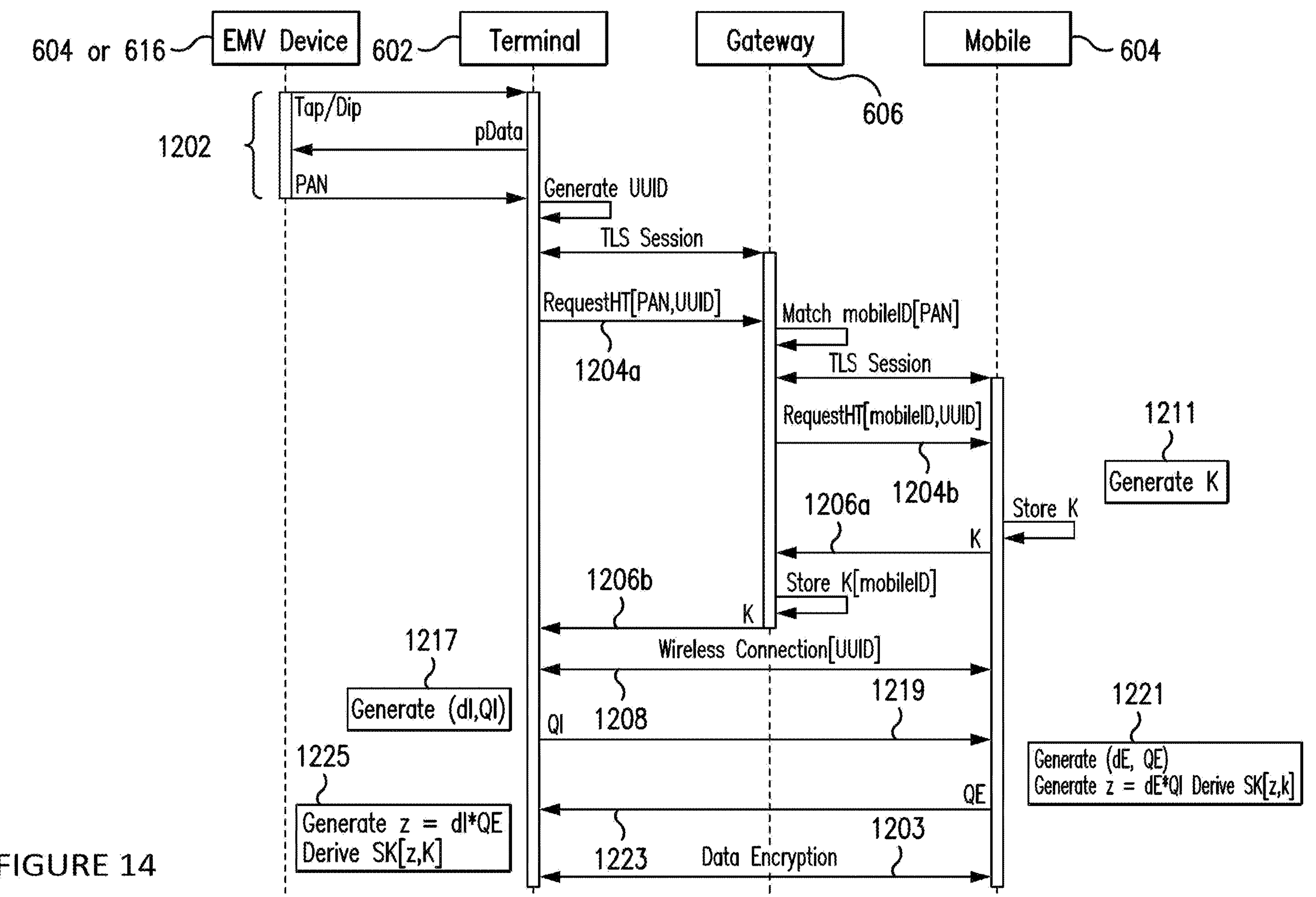
FIG. 14 is a sequence diagram showing the events occurring between the payment terminal, the platform gateway and the mobile device in establishing the secure communication channel shown in FIGS. 6 and 7, for embodiments in which the handover token (HT) comprises a mobile device secret key (K)

Further details of how the secure communication channel 612*a*, 612*b* is established during a payment transaction will now be outlined with reference to FIGS. 12 to 14.

FIG. 12 is a sequence diagram showing the events occurring between the transaction device 604, 616, which is also called the EMV device, the payment terminal 602, the platform gateway 606 and the mobile device 604, in establishing the secure communication channel 612*a*, 612*b* between the payment terminal 602 and the mobile device 604. The payment terminal 602 and the mobile device 604 are used as examples of the initiator device 102 and the endpoint device 104, respectively. Firstly, an EMV transaction 1202 is performed between the EMV device 604, 616 and the payment terminal 602. A first TLS session is established between the payment terminal 602 and the platform gateway 606, and a second TLS session is established between the platform gateway 606 and the mobile device 604.

The payment terminal 602 submits, at Event 1204*a*, the request for a handover token (HT) to the platform gateway 606 using the first TLS session between the payment terminal 602 and the platform gateway 606. The handover token (HT) request is then submitted, at Event 1204*b*, from the platform gateway 606 to the mobile device 604 using the second TLS session between the platform gateway 606 and the mobile device 604. The handover token (HT) is then shared, at Event 1206*a*, from the mobile device 604 to the platform gateway 606, using the second TLS session, and then shared, at Event 1206*b*, from the platform gateway 606 to the payment terminal 602, using the first TLS session. As part of the request, a wireless connection 1208 is established between the payment terminal 602 and the mobile device 604, comprised within the physical layer 608.

Once the payment terminal 602 is in possession of the handover token (HT), it performs a method called 'Key Agreement' 1201. Key Agreement 1201 is the process of using the handover token (HT) to establish the secure communication channel 612*a*, 612*b* between the payment terminal 602 and the mobile device 604.

The secure communication channel 612*a*, 612*b*, which is referred to in FIG. 12 as 'Data Encryption' 1203, is thereby established. The secure communication channel 612*a*, 612*b* forms part of the security layer 610. The secure communication channel 612*a*. 612*b* may be wireless, or part of the secure communication channel may be wired, e.g. between the payment terminal 602 and the platform gateway 606.

The established secure communication channel 612*a*, 612*b* is independent of the wireless connection that forms part of the physical layer 608. In addition, the established secure communication channel 612*a*, 612*b* is independent of the EMV layer 614 comprising the EMV channels for the EMV transaction 1202. Furthermore, the established secure communication channel 612*a*, 612*b* is independent of the proprietary layer 618 shown in FIG. 7. Moreover, within the security layer 610, the established secure communication channel 612*a*, 612*b* is independent of the TLS sessions.

FIGS. 13 and 14 show the events shown in FIG. 12 in further detail in respect of transmission of the payment card identifier (PAN). The events occurring as part of the simplified EMV transaction 1202 between the EMV device 604, 616 and the payment terminal 602 are shown first. This involves the user tapping or dipping the EMV device 604, 616 on the payment terminal 602, followed by the payment terminal 602 submitting the payment data (pData) to the EMV device 604, 616, and then the EMV device 604, 616 returning the PAN from the EMV device 604, 616 to the payment terminal 602.

Next, the events occurring as part of the request (Events 1204*a*, 1204*b*) for the handover token (HT) from the payment terminal 602, via the platform gateway 606, to the mobile device 604, are described.

As part of the request (Events 1204*a*, 1204*b*), the payment terminal 602 generates a unique identifier (UUID) to represent the communication channel, and sends the PAN and UUID to the platform gateway 606. The platform gateway 606 retrieves the mobile identifier (mobileID) corresponding to the PAN and sends the UUID to the mobile device 604 identified by the mobileID.

Alternatively, if the EMV device 604, 616 is the mobile device 604, the UUID is generated by the mobile device 604 returning the UUID to the payment terminal 602 along with the PAN.

As shown in FIGS. 13 and 14, the payment terminal 602 submits, at Event 1204*a*, the request for a handover token (HT) to the platform gateway 606 using the first TLS session between the payment terminal 602 and the platform gateway 606. The handover token (HT) request is then submitted, at Event 1204*b*, from the platform gateway 606 to the mobile device 604 using the second TLS session between the platform gateway 606 and the mobile device 604.

As part of the request (Events 1204*a*, 1204*b*), a wireless connection 1208 is established between the payment terminal 602 and the mobile device 604, comprised within the physical layer 608. The wireless connection 1208 may be a cloud-based connection or a P2P connection. The wireless connection 1208 may be established as soon as the payment terminal 602 and the mobile device 604 shared the UUID.

The events occurring between the EMV device 604, 616, payment terminal 602, the platform gateway 606 and the mobile device 604 in establishing the secure communications channel between the payment terminal 602 and the mobile device 604 are shown for embodiments in which the handover token (HT) comprises a mobile device public key (QE) in FIG. 13. Accordingly, events corresponding to the process steps shown in FIG. 9 are shown in FIG. 13, alongside the events shown in FIG. 12, in further detail.

The mobile device 604 generates, at Event 1209, a mobile device cryptographic key pair (dE, QE), wherein the mobile device cryptographic key pair (dE, QE) comprises a mobile device private key (dE) and a mobile device public key (QE). The mobile device private key (dE) may comprise a random number. The mobile device 604 stores the private key (dE). The mobile device 604 may also store the public key (QE). The mobile device 604 then sends, at Event 1206*a*, the mobile device public key (QE) to the platform gateway 606 using the second TLS session, wherein the mobile device public key (QE) corresponds to the mobileID. The platform gateway 606 stores the mobile device public key (QE) and sends, at Event 1206*b*, the mobile device public key (QE) to the payment terminal 602 using the first TLS session. The mobile device public key (QE) is comprised within the handover token (HT).

Key Agreement 1201 is the process of using the handover token (HT) to establish the secure communication channel 612*a*, 612*b*. Key Agreement 1201 includes Events 1214 to 1218 and is described in further detail below.

The payment terminal 602 generates, at Event 1214, an initiator device cryptographic key pair (dI, QI), comprising a private key (dI) and a public key (QI), and then computes a shared secret (z) using the private key (dI) of the initiator device cryptographic key pair and the public key (QE) received from the platform gateway 606. The payment terminal 602 then derives a session key (SK) from the shared secret (z).

The payment terminal 602 then sends, at Event 1216, the public key (QI) of the initiator device cryptographic key pair (dI, QI) to the mobile device 604 for generation of the same session key (SK). After receiving the public key (QI) of the initiator device cryptographic key pair (dI, QI), the mobile device 604 computes, at Event 1218, a shared secret (z) using the stored private key (dE) of the mobile device cryptographic key pair (dE, QE) and the public key (QI) received from the payment terminal 602. The mobile device 604 then derives a session key (SK) from the shared secret (z) computed at the mobile device 604.

When data are encrypted with SK using an encryption-authentication algorithm (e.g. AES-GCM), this provides authentication of the payment terminal 602 to the mobile device 604, and simultaneously provides authentication of the mobile device 604 to the payment terminal 602. In other words, mutual authentication is performed between the payment terminal 602 and the mobile device 604. The secure communication channel 612*a*, 612*b* between the payment terminal 602 and the mobile device 604 is thus established ('Data Encryption' 1203, as shown in FIG. 13).

Turning to FIG. 14, the events occurring between the EMV device 604, 616, payment terminal 602, the platform gateway 606 and the mobile device 604 in establishing the secure communication channel between the payment terminal 602 and the mobile device 604 are shown for embodiments in which the handover token (HT) comprises a mobile device secret key (K). Accordingly, events corresponding to the process steps shown in FIG. 10 are shown in FIG. 14, alongside events shown in FIG. 12, in further detail.

The mobile device 604 generates, at Event 1211, a mobile device secret key (K). The mobile device secret key (K) may comprise a random number. The mobile device 604 stores the mobile device secret key (K). The mobile device 604 then sends, at Event 1206*a*, the mobile device secret key (K) to the platform gateway 606 using the second TLS session. The platform gateway 606 stores the mobile device secret key (K) with the corresponding mobile ID, and sends, at Event 1206*b*, the mobile device secret key (K) to the payment terminal 602 using the first TLS session. The handover token (HT) comprises the mobile device secret key (K).

Next, at Event 1217, the payment terminal 602 generates an initiator device cryptographic key pair (dI, QI), comprising a private key (dI) and a public key (QI). The payment terminal 602 then sends, at Event 1219, the public key (QI) of the initiator device cryptographic key pair (dI, QI) to the mobile device 604 for generation of a session key (SK).

At Event 1221, the mobile device 604 generates a mobile device cryptographic key pair (dE, QE), wherein the mobile device cryptographic key pair (dE. QE) comprises a mobile device private key (dE) and a mobile device public key (QE). The mobile device 604 then computes a shared secret (z) using the generated private key (dE) of the mobile device cryptographic key pair (dE, QE) and the public key (QI) received from the payment terminal 602. The mobile device 604 then derives a session key (SK) from the shared secret (z) computed at the mobile device 604 and the stored mobile device secret key (K).

The mobile device 604 then sends, Event 1223, the mobile device public key (QE) to the payment terminal 602. After receiving the mobile device public key (QE), the payment terminal 602 computes, at Event 1225, a shared secret (z) using the private key (dI) of the initiator device cryptographic key pair (dI, QI) and the received mobile device public key (QE). The payment terminal 602 also derives a session key (SK) from the shared secret (z) computed at the mobile device 604 and the mobile device secret key (K).

When data are encrypted with SK using an encryption-authentication algorithm (e.g. AES-GCM), this provides authentication of the payment terminal 602 to the mobile device 604, and simultaneously provides authentication of the mobile device 604 to the payment terminal 602. In other words, mutual authentication is performed between the payment terminal 602 and the mobile device 604. The secure communication channel 612*a*, 612*b* between the payment terminal 602 and the mobile device 604 is thus established ('Data Encryption' 1203, as shown in FIG. 14).

Key Agreement 1201 is the process of using the handover token (HT) to establish the secure communication channel 612*a*, 612*b*. In the present embodiment (FIG. 14), Key Agreement 1201 includes Events 1217 to 1225.

The secure communication channel 612*a*, 612*b*, once established, can then be used to continue a transaction wirelessly, i.e. a wireless transaction, if required. For example, a secure wireless transaction could be performed for a new amount, or a new payment card, or a different digitised payment card in the mobile wallet. The secure communication channel 612*a*, 612*b* can also be used to send messages securely between the merchant and the mobile device, e.g. VAS messages.

FIGS. 15 to 20, along with the accompanying description below, illustrate embodiments of the disclosure involving establishment of a 'terminal-service' secure communication channel between a payment terminal and a service provider, and/or a 'mobile-service' secure communication channel between a mobile device and a service provider.

A payment terminal 1702, or a mobile device 1704, is used as an example of the initiator device 102. A service provider 1709 is used as an example of the endpoint device 104. A platform gateway 1706 is used as an example of the intermediary server 106.

Figure 15:
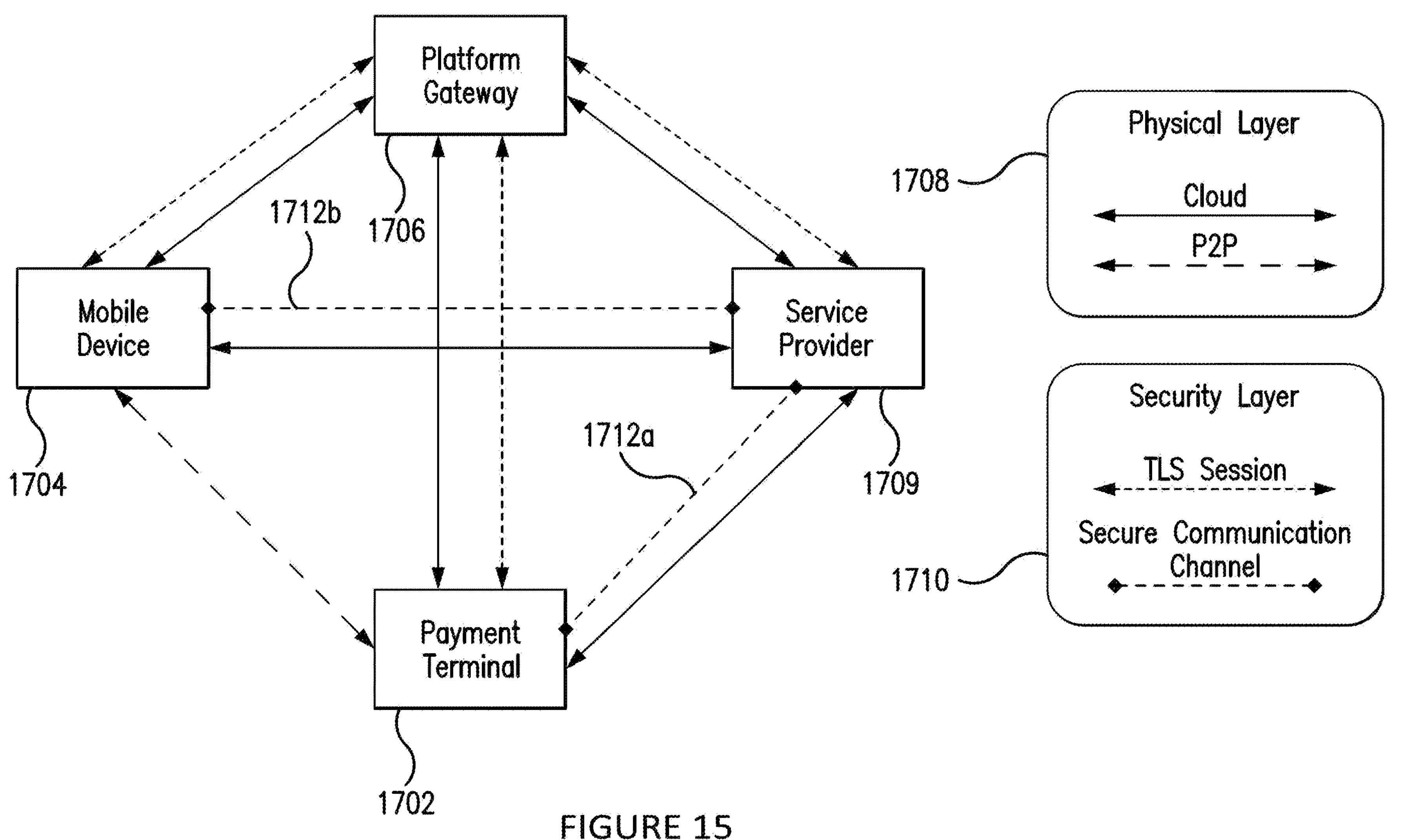
FIG. 15 is a schematic diagram showing a payment terminal, a mobile device, a platform gateway and a service provider, alongside a physical layer and a security layer connecting the four entities, wherein the security layer includes a secure communication channel between the payment terminal and the service provider, and between the mobile device and the service provider, in accordance with a second embodiment of the present disclosure.

As shown in FIG. 15, a physical layer 1708 connects the four entities 1702, 1704, 1706, 1709. The physical layer 1708 comprises cloud-based communications between the payment terminal 1702 and the platform gateway 1706, and between the mobile device 1704 and the platform gateway 1706. The physical layer 1708 further comprises cloud-based communications between the platform gateway 1706 and the service provider 1709, and between the payment terminal 1702 and the service provider 1709. The physical layer 1708 also comprises a P2P communication between the payment terminal 1702 and the mobile device 1704.

The system shown in FIG. 15 further comprises a security layer 1710. The security layer 1710 includes a terminal-service secure communication channel 1712*a* between the payment terminal 1702 and the service provider 1709. The security layer 1710 further comprises a mobile-service secure communication channel 1712*b* between the mobile device 1704 and the service provider 1709.

The secure communication channels 1712*a*, 1712*b* enable messages to be exchanged securely between the payment terminal 1702 and the service provider 1709, and between the mobile device 1704 and the service provider 1709, respectively. The secure communication channels 1712*a*, 1712*b* may comprise a wireless connection or a wired connection.

The secure communication channel is implemented directly between the payment terminal 1702 and the service provider 1709, or between the mobile device 1704 and the service provider 1709, using a direct secure communication channel. Alternatively, the secure communication channel may be implemented indirectly via the platform gateway 1706.

The security layer 1710 further comprises a Transport Layer Security (TLS) protocol connection between the mobile device 1704 and the platform gateway 1706, and between the payment terminal 1702 and the platform gateway 1706. The security layer 1710 further comprises a Transport Layer Security (TLS) protocol connection between the platform gateway 1706 and the service provider 1709. The TLS protocol enables the communications between these entities to be encrypted in order to prevent eavesdropping and tampering.

The secure communication channels 1712*a*, 1712*b* provides the following advantages. Once the secure communication channels 1712*a*, 1712*b* are established, the payment terminal 1702 and the service provider 1709 are able to connect in a secure manner, and the mobile device 1704 and the service provider 1709 are able to connect in a secure manner.

This provides the ability to the payment terminal 1702 or the mobile device 1704 to access services provided by the service provider via a secure connection. A further advantage is that the entities accessing the platform gateway, namely the payment terminal 1702, the mobile device 1704 and the service provider 1709 can be authenticated. The system also ensures user privacy during the wireless service access, as well as user privacy when accessing a cloud service. A further advantage is that it provides integrity and conditional confidentiality of data exchanged between the payment terminal 1702 and the service provider 1709, and between the mobile device 1704 and the service provider 1709.

Figure 16:
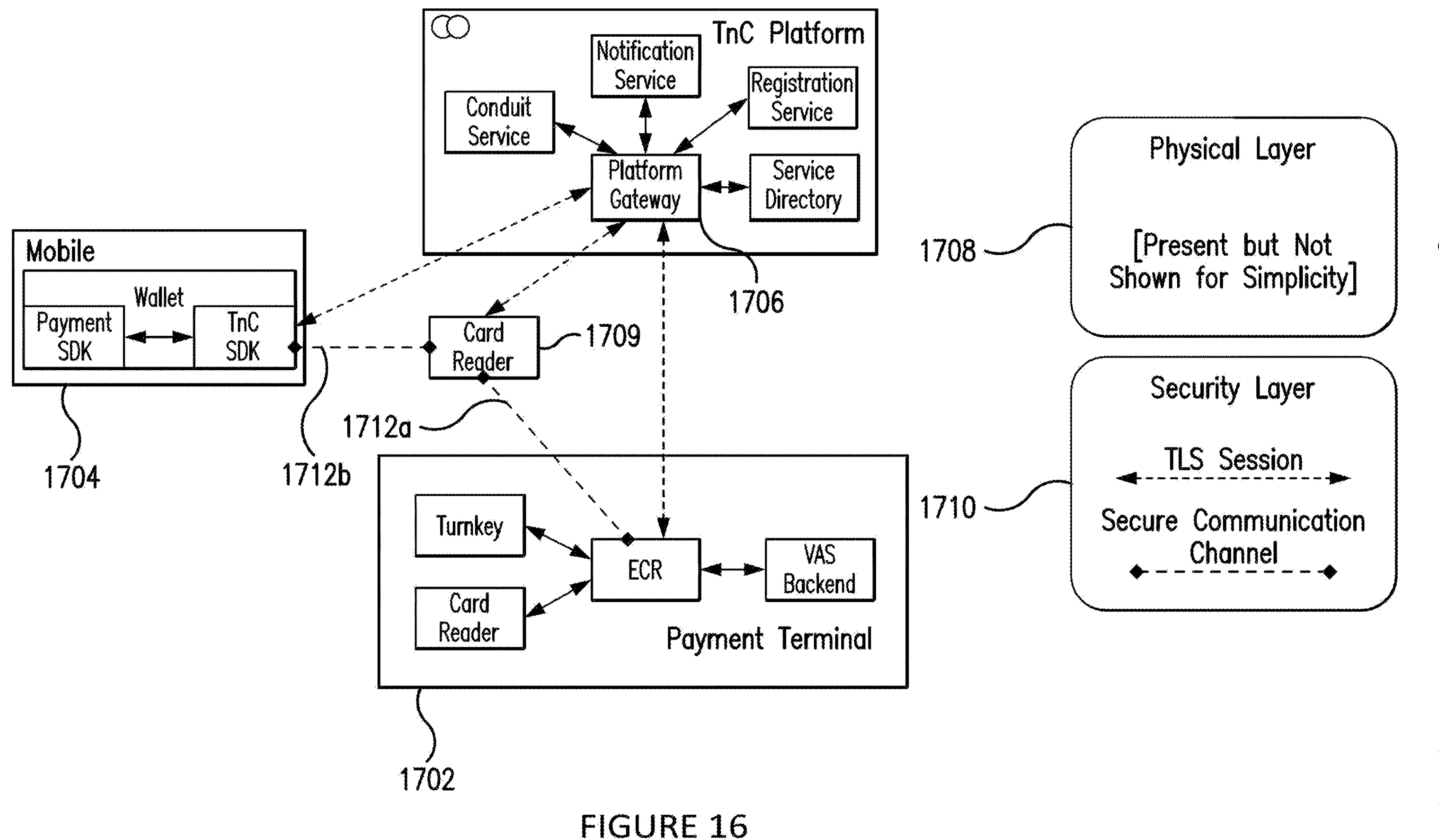
FIG. 16 is a schematic diagram showing components of the payment terminal, the mobile device and the platform gateway shown in FIG. 15, and the corresponding layers of interaction, in accordance with the second embodiment.

FIG. 16 shows relevant components of the payment terminal 1702, the mobile device 1704 and the platform gateway 1706 as well as the above-described interactions in further detail. The service provider 1709 is also shown in FIG. 16.

Starting with the payment terminal 1702, the payment terminal 1702 comprises a turnkey, a card reader, an electronic cash register (ECR) and a value-added services (VAS) backend. The mobile device 1704 comprises a mobile wallet, which itself includes a payment SDK and a 'Tap and Connect' (TnC) SDK. The platform gateway 1706 is provided as part of a TnC platform. The TnC platform comprises a conduit service, a notification service, a registration service and a service directory, all of which are in communication with the platform gateway 1706.

The physical layer 1708 is shown as present in the system architecture of FIG. 16, however it is omitted from the diagram for the sake of simplicity. The physical layer 1708 comprises cloud-based communications between the ECR of the payment terminal 1702 and the platform gateway 1706. The physical layer 1708 further comprises cloud-based communications between the TnC SDK of the mobile device 1704 and the platform gateway 1706. The physical layer 1708 further comprises cloud-based communications between the platform gateway 1706 and the service provider 1709, and between the ECR of the payment terminal 1702 and the service provider 1709.

As can be seen in FIG. 16, the mobile-service secure communication channel 1712*b*, which is part of the security layer 1710, is established between the THC SDK of the mobile device 1704 and the service provider 1709. The terminal-service secure communication channel 1712*a*, which is part of the security layer 1710, is established between the ECR of the payment terminal 1702 and the service provider 1709.

Transport Layer Security (TLS) protocol connections, which are also part of the security layer 1710, are established between the TnC SDK of the mobile device 1704 and the platform gateway 1706, and between the ECR of the payment terminal 1702 and the platform gateway 1706. A further Transport Layer Security (TLS) protocol connection is provided between the platform gateway 1706 and the service provider 1709. The TLS protocol connections enable the communications between these entities to be encrypted to prevent eavesdropping and tampering.

The process of establishing the secure communication channels 1712*a*, 1712*b* will now be described with reference to FIGS. 17 and 18.

Figure 17:
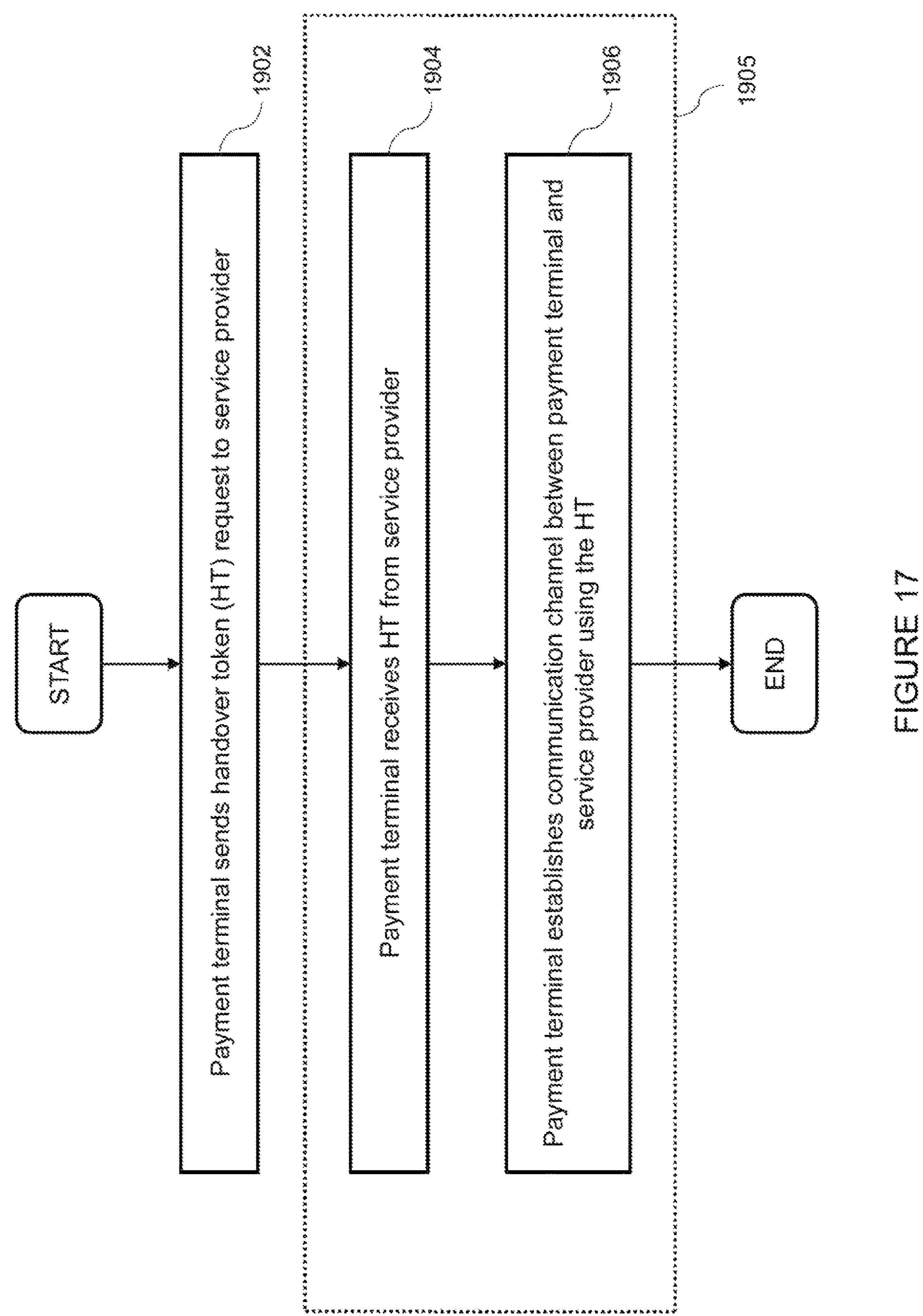
FIG. 17 is a flow chart showing a process, performed by the payment terminal, of establishing the secure communication channel between the payment terminal and the service provider as shown in FIGS. 15 and 16, in accordance with the second embodiment.

FIG. 17 shows the process performed by the payment terminal 1702 in establishing the terminal-service secure communication channel 1712*a*. Firstly, the payment terminal 1702 sends, at Step 1902, a request for a handover token (HT) to the service provider 1709. The payment terminal 1702 then receives, at Step 1904, the handover token (HT) from the service provider 1709. Lastly, the payment terminal 1702 establishes, at Step 1906, using the received handover token (HT), the terminal-service secure communication channel 1712*a* between the payment terminal 1702 and the service provider 1709. Collective Step 1905, which comprises Steps 1904 and 1906, is analogous to Collective Step 205 of FIG. 2, where the payment terminal 1702 is the initiator device 102 and the service provider is the endpoint device 104. Accordingly, in some embodiments, Collective Step 1905 involves the handover token (HT) comprising an endpoint public key (QE), whereas in other embodiments, Collective Step 1905 involves the handover token (HT) comprising an endpoint secret key (K). Therefore, Collective Step 1905 can be expanded into process steps that are analogous to the expansion of Collective Step 205, namely Steps 302 to 312 of FIG. 3 and Steps 402 to 414 of FIG. 4, and the corresponding description provided above with reference to FIGS. 2 to 4 applies in embodiments to which FIG. 17 relates.

Figure 18:
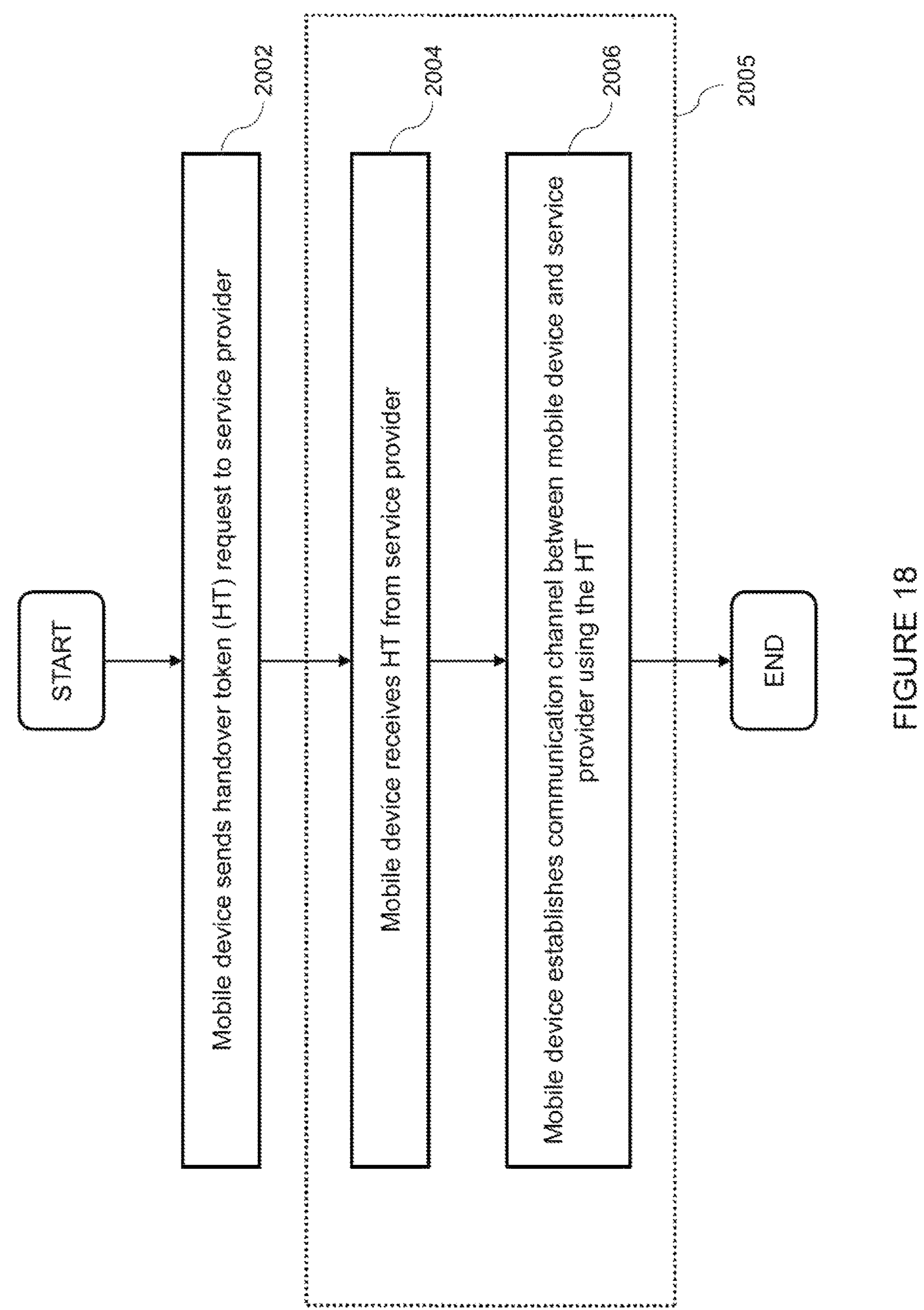
FIG. 18 is a flow chart showing a process, performed by the mobile device, of establishing the secure communication channel between the mobile device and the service provider as shown in FIGS. 15 and 16, in accordance with the second embodiment.

FIG. 18 shows the process performed by the mobile device 1704 in establishing the mobile-service secure communication channel 1712*b*. Firstly, the mobile device 1704 sends, at Step 2002, a request for a handover token (HT) to the service provider 1709. The mobile device 1704 then receives, at Step 2004, the handover token (HT) from the service provider 1709. Lastly, the mobile device 1704 establishes, at Step 2006, using the received handover token (HT), the mobile-service secure communication channel 1712*b* between the mobile device 1704 and the service provider 1709. Collective Step 2005, which comprises Steps 2004 and 2006, is analogous to Collective Step 205 of FIG. 2, where the mobile device 1704 is the initiator device 102 and the service provider is the endpoint device 104. Accordingly, in some embodiments, Collective Step 2005 involves the handover token (HT) comprising an endpoint public key (QE), whereas in other embodiments, Collective Step 2005 involves the handover token (HT) comprising an endpoint secret key (K). Therefore, Collective Step 2005 can be expanded into process steps that are analogous to the expansion of Collective Step 205, namely Steps 302 to 312 of FIG. 3 and Steps 402 to 414 of FIG. 4, and the corresponding description provided above with reference to FIGS. 2 to 4 applies in embodiments to which FIG. 18 relates.

It should be noted that the methods performed by the service provider 1709 in establishing the terminal-service secure communication channel 1712*a* and the mobile-service secure communication channel 1712*b* are also analogous to the process shown in FIG. 11. The service provider 1709 receives a request for a handover token (HT) from the payment terminal 1702 (for establishing the terminal-service channel 1712*a*) or from the mobile device 1704 (for establishing the mobile-service channel 1712*b*). The requested handover token (HT) comprises data that is configured to be used in setting up the secure communication channels 1712*a*, 1712*b*. The service provider 1709 then sends the handover token (HT) to the payment terminal 1702 (for establishing the terminal-service channel 1712*a*) or mobile device 1704 (for establishing the mobile-service channel 1712*b*) for establishing the secure communication channels 1712*a*, 1712*b*.

Figure 19:
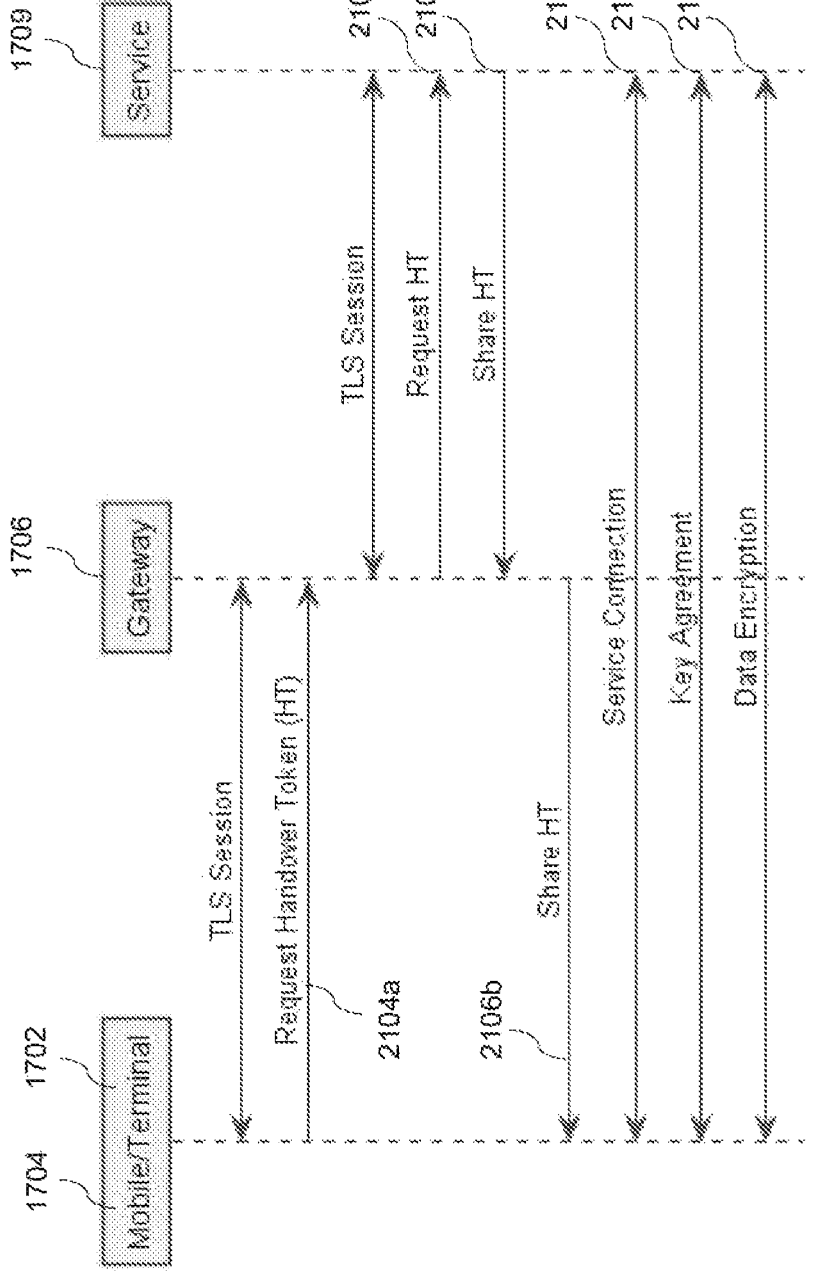
FIG. 19 is a sequence diagram showing the events occurring between the payment terminal or the mobile device, the platform gateway and the service provider in establishing the secure communication channel shown in FIGS. 15 and 16, in accordance with the second embodiment.
Figure 20:
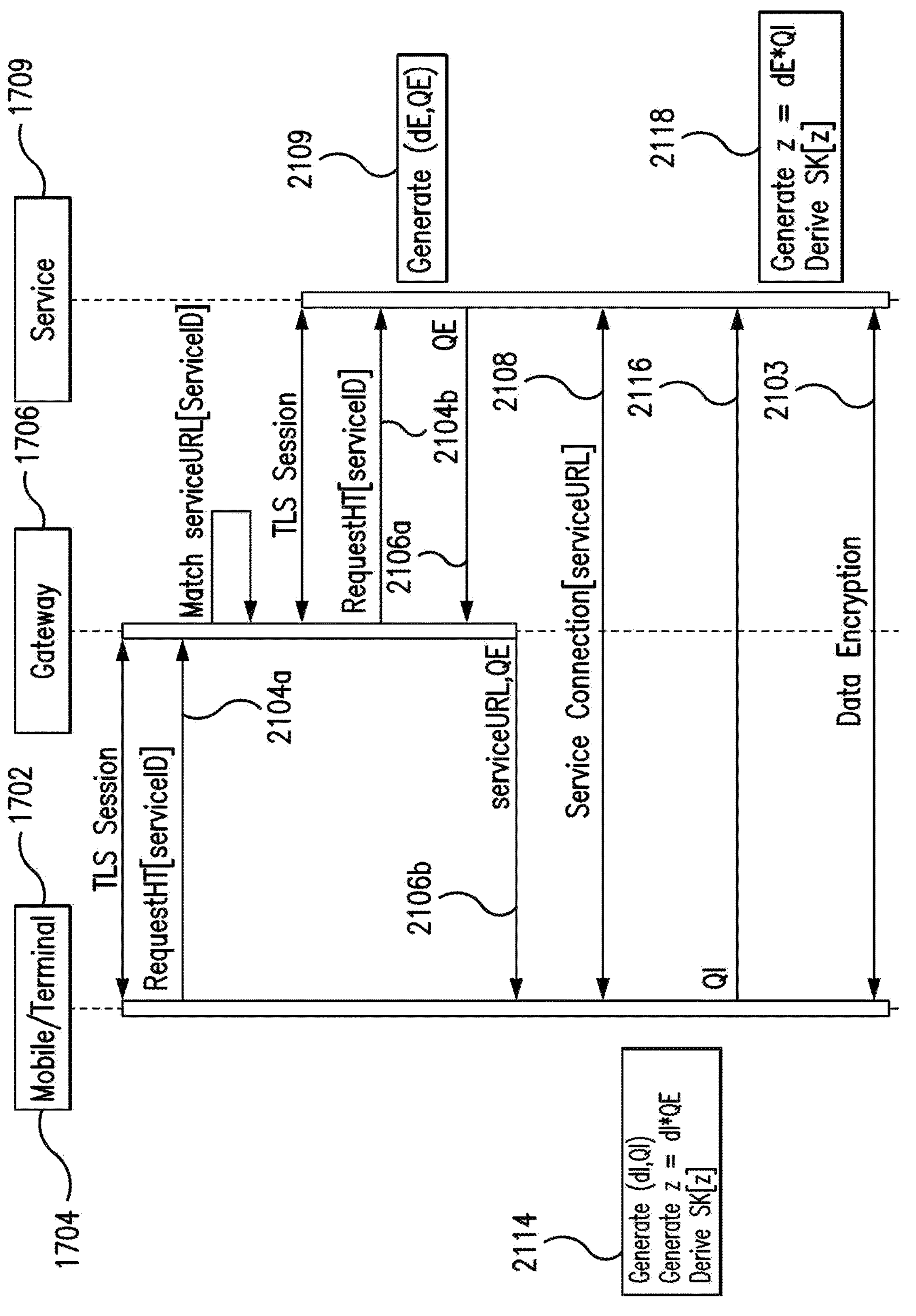
FIG. 20 is a sequence diagram showing the events occurring between the payment terminal or the mobile device, the platform gateway and the service provider in establishing the secure communication channel shown in FIGS. 15 and 16, where the handover token (HT) comprises an endpoint public key (QE), in accordance with the second embodiment.

Further details of how the secure communication channels 1712*a*, 1712*b* are established will now be outlined with reference to FIGS. 19 and 20.

FIG. 19 is a sequence diagram showing the events occurring between the payment terminal 1702 or the mobile device 1704, the platform gateway 1706 and the service provider 1709, in establishing the secure communication channels 1712*a*, 1712*b*. A first TLS session is established between the payment terminal 1702 or the mobile device 1704 and the platform gateway 1706, and a second TLS session is established between the platform gateway 1706 and the service provider 1709.

The payment terminal 1702 or the mobile device 1704 submits, at Event 2104*a*, the request for a handover token (HT) to the platform gateway 1706 using the first TLS session between the payment terminal 1702 or the mobile device 1704 and the platform gateway 1706. The handover token (HT) request is then submitted, at Event 2104*b*, from the platform gateway 1706 to the service provider 1709 using the second TLS session between the platform gateway 1706 and the service provider 1709. The handover token (HT) is then shared, at Event 2106*a*, from the service provider 1709 to the platform gateway 1706, using the second TLS session, and then shared, at Event 2106*b*, from the platform gateway 1706 to the payment terminal 1702 or the mobile device 1704, using the first TLS session. As part of the request, a service connection 2108 is established between the payment terminal 1702 or the mobile device 1704 and the service provider 1709, comprised within the physical layer 1708.

Once the payment terminal 1702 or the mobile device 1704 is in possession of the handover token (HT), it performs a method called Key Agreement 2101. Key Agreement 2101 is the process of using the handover token (HT) to establish the secure communication channels 1712*a*, 1712*b*.

The secure communication channels 1712*a*, 1712*b*, which is referred to in FIG. 19 as 'Data Encryption' 2103, are thereby established. The secure communication channels 1712*a*, 1712*b* forms part of the security layer 1710. The secure communication channels 1712*a*, 1712*b* may be wireless or wired.

The established secure communication channels 1712*a*, 1712*b* are independent of the wireless connection that forms part of the physical layer 1708. Furthermore, within the security layer 1710, the established secure communication channels 1712*a*. 1712*b* are independent of the TLS sessions.

Turning to FIG. 20, the events occurring between the payment terminal 1702 or the mobile device 1704, the platform gateway 1706 and the service provider 1709 in establishing the secure communication channel is shown for embodiments in which the handover token (HT) comprises a service public key (QE). Accordingly, events corresponding to the steps shown in FIGS. 17 to 19 are shown in further detail.

As shown in FIG. 20, the payment terminal 1702 or the mobile device 1704 submits, at Event 2104*a*, the request for a handover token (HT) to the platform gateway 1706 using the first TLS session. The handover token (HT) request comprises a service identifier (serviceID) to indicate which service provider 1709 the handover token (HT) request relates to. The platform gateway 1706 retrieves the service provider URL (serviceURL) and the handover token (HT) request is then submitted, at Event 2104*b*, from the platform gateway 1706 to the service provider 1709 using the second TLS session.

The service provider 1709 generates, at Event 2109, a service cryptographic key pair (dE, QE), wherein the service provider cryptographic key pair (dE, QE) comprises a service private key (dE) and a service public key (QE). The service provider 1709 then sends, at Event 2106*a*, the service public key (QE) to the platform gateway 1706 using the second TLS session. The platform gateway 1706 then sends, at Event 2106*b*, the service public key (QE) along with the serviceURL to the payment terminal 1702 or the mobile device 1704 using the first TLS session.

As part of the request (Events 2104*a*, 2104*b*), a service connection 2108 is established between the payment terminal 1702 or the mobile device 1704 and the service provider 1709, comprised within the physical layer 1708. The wireless connection 2108 is a cloud-based connection. The wireless connection 2108 may be established as soon as the payment terminal 1702 or the mobile device 1704 received the serviceURL.

Key Agreement 2101 is the process of using the handover token (HT) to establish the secure communication channels 1712*a*, 1712*b*. Key Agreement 2101 includes Events 2114 to 2118 and is described in further detail below.

The payment terminal 1702 or the mobile device 1704, at Event 2114, generates an initiator device cryptographic key pair (dI, QI), comprising a private key (dI) and a public key (QI), and then computes a shared secret (z) using the private key (dI) of the initiator device cryptographic key pair and the public key (QE) received from the platform gateway 1706. The payment terminal 1702 or the mobile device 1704 then derives a session key (SK) from the shared secret (z).

The payment terminal 1702 or the mobile device 1704 may connect, at Event 2108, to the service provider 1709 using the serviceURL in a cloud-based connection or 'Service Connection' as shown in FIG. 20.

The payment terminal 1702 or the mobile device 1704 then sends, at Event 2116, the public key (QI) of the initiator device cryptographic key pair (dI, QI) to the service provider 1709 for generation of the same session key (SK).

After receiving the public key (QI) of the initiator device cryptographic key pair (dI, QI), the service provider 1709 computes, at Event 2118, a shared secret (z) using the stored private key (dE) of the mobile device cryptographic key pair (dE, QE) and the public key (QI) received from the payment terminal 1702 or the mobile device 1704. The service provider 1709 then derives a session key (SK) from the shared secret (z) computed at the service provider 1709.

When data are encrypted with SK using an encryption-authentication algorithm (e.g. AES-GCM), this provides authentication of the payment terminal 1702 or the mobile device 1704 to the service provider 1709, and simultaneously provides authentication of the service provider 1709 to the payment terminal 1702 or the mobile device 1704. In other words, mutual authentication is performed between the payment terminal 1702 or the mobile device 1704 and the service provider 1709.

The secure communication channels 1712*a*, 1712*b* between the payment terminal 1702 or the mobile device 1704 and the service provider 1709 are thus established ('Data Encryption' 2103, as shown in FIG. 20).

For embodiments in which the handover token (HT) comprises a mobile device secret key (K), it should be noted that the events occurring between the payment terminal 1702 or the mobile device 1704, the platform gateway 1706 and the service provider 1709 in establishing the secure communication channels are analogous to the events shown in FIG. 14 and the corresponding description above.

After a communication channel for exchanging messages securely between a payment terminal 602, 1702 and a mobile device 604, 1704 has been established, the communication channel can be used to perform a secure wireless transaction, e.g. a wireless payment transaction.

Many modifications may be made to the specific embodiments described above without departing from the scope of the invention as defined in the accompanying claims. Features of one embodiment may also be used in other embodiments, either as an addition to such embodiment or as a replacement thereof. It is to be understood that a payment card and a mobile device are used in the present disclosure as non-limiting examples of transaction devices. In other embodiments, the transaction device may be an alternative transaction device carrying card data, e.g. tablets or watches.

The invention claimed is:

1. A computer-implemented method for establishing a communication channel for exchanging messages securely between an initiator device and an endpoint device using an intermediary server, wherein the initiator device is in communication with the intermediary server via a first session encrypted according to a cryptographic protocol, and the endpoint device is in communication with the intermediary server via a second session encrypted according to a cryptographic protocol, and wherein the method is performed at the initiator device, the method comprising:

sending, to the intermediary server, a request for a handover token (HT) via the first session encrypted according to a cryptographic protocol, wherein the handover token (HT) comprises cryptographic data generated at the endpoint device that is configured to be used to establish the communication channel between the initiator device and the endpoint device;

receiving, from the intermediary server, the handover token (HT) via the first session encrypted according to a cryptographic protocol; and establishing, using the handover token (HT), the communication channel between the initiator device and the endpoint device.

2. The method of claim 1, wherein sending the request for handover token (HT) is triggered by a payment transaction between a transaction device and the initiator device.

3. The method of claim 1, wherein the communication channel is established between the initiator device and the endpoint device via the intermediary server.

4. The method of claim 1, wherein the handover token comprises a public key (QE) of an endpoint cryptographic key pair (dE, QE), comprising a private key (dE) and a public key (QE), which has been generated at the endpoint device.

5. The method of claim 4, comprising:

receiving, from the intermediary server, the public key (QE);

generating an initiator device cryptographic key pair (dI, QI), comprising a private key (dI) and a public key (QI);

computing a shared secret (z) using the private key (dI) of the initiator device cryptographic key pair and the public key (QE) received from the intermediary server;

deriving a session key (SK) from the shared secret (z);

sending, to the endpoint device, the public key (QI) of the initiator device cryptographic key pair (dI, QI) for generation of the same session key (SK); and establishing, using the session key (SK), the communication channel between the initiator device and the endpoint device.

6. The method of claim 1, wherein the handover token comprises a secret key (K) which has been generated at the endpoint device.

7. The method of claim 6, comprising:

receiving, from the intermediary server, the secret key (K);

generating an initiator device cryptographic key pair (dI, QI), comprising a private key (dI) and a public key (QI);

sending, to the endpoint device, the public key (QI) of the initiator device cryptographic key pair (dI, QI) for generation of a session key (SK);

receiving, from the endpoint device, a public key (QE) of an endpoint cryptographic key pair (dE, QE), comprising a private key (dE) and a public key (QE), which has been generated at the endpoint device;

computing a shared secret (z) using the private key (dl) of the initiator device cryptographic key pair and the public key (QE) received from the endpoint device;

deriving a session key (SK) from the shared secret (z) using the secret key (K); and establishing, using the session key (SK), the communication channel between the initiator device and the endpoint device.

8. The method of claim 1, wherein the initiator device comprises a payment terminal, the endpoint device comprises a mobile device, the intermediary server comprises a service gateway, the method comprising:

establishing, using the handover token, the communication channel between the payment terminal and the mobile device.

9. The method of claim 8, wherein the mobile device and the payment terminal are provisioned with transaction data, and the method is performed during a payment transaction between a transaction device and the payment terminal.

10. The method of claim 9, comprising:

receiving, from the transaction device, a payment card identifier (PAN) upon initiation of the payment transaction;

sending, to the service gateway, the payment card identifier (PAN) with a request for the handover token (HT), wherein the handover token (HT) corresponds to the mobile device associated to the payment card identifier (PAN);

receiving, from the service gateway, the handover token (HT) corresponding to the mobile device associated to the payment card identifier (PAN); and establishing, using the received handover token (HT), the communication channel between the mobile device and the payment terminal.

11. The method of claim 9, wherein the communication channel is independent of communication means for the payment transaction.

12. The method of claim 9, wherein the payment transaction is an EMV payment transaction.

13. The method of claim 12, wherein the EMV payment transaction is performed using NFC technology.

14. The method of claim 9, wherein the transaction device is the mobile device and the mobile device comprises a digitised version of a payment card.

15. The method of claim 9, wherein the transaction device comprises a payment card and the mobile device comprises a digitised version of the payment card.

16. The method of claim 12, wherein the EMV payment transaction is performed by a contact-based EMV payment transaction.

17. The method of claim 1, wherein the initiator device comprises a payment terminal, the endpoint device comprises a service provider, the intermediary server comprises a platform gateway, the method comprising:

establishing, using the handover token, the communication channel between the payment terminal and the service provider.

18. The method of claim 1, wherein the initiator device comprises a mobile device, the endpoint device comprises a service provider, the intermediary server comprises a platform gateway, the method comprising:

establishing, using the handover token, the communication channel between the mobile device and the service provider.

19. A non-transitory computer-readable storage medium comprising instructions which, when executed by a computer, cause the computer to:

establish a communication channel for exchanging messages securely between an initiator device and an endpoint device using an intermediary server, wherein the initiator device is in communication with the intermediary server via a first session encrypted according to a cryptographic protocol, and the endpoint device is in communication with the intermediary server via a second session encrypted according to a cryptographic protocol;

send, to the intermediary server, a request for a handover token (HT) via the first session encrypted according to a cryptographic protocol, wherein the handover token (HT) comprises cryptographic data generated at the endpoint device that is configured to be used to establish the communication channel between the initiator device and the endpoint device;

receive, from the intermediary server, the handover token (HT) via the first session encrypted according to a cryptographic protocol; and establish, using the handover token (HT), the communication channel between the initiator device and the endpoint device.

20. A computer-implemented method of establishing a communication channel for exchanging messages securely between an initiator device and an endpoint device using an intermediary server, wherein the initiator device is in communication with the intermediary server via a first session encrypted according to a cryptographic protocol, and the endpoint device is in communication with the intermediary server via a second session encrypted according to a cryptographic protocol, and wherein the method is performed at the intermediary server, the method comprising:

receiving, from the initiator device, a request for a handover token (HT), wherein the requested handover token (HT) comprises data that has been generated at the endpoint device and is configured to be used in setting up the communication channel between the initiator device and the endpoint device; and sending, to the initiator device, the handover token (HT) for establishing the communication channel between the initiator device and the endpoint device wherein the handover token (HT) comprises cryptographic data generated at the endpoint device that is configured to be used to establish the communication channel between the initiator device and the endpoint device.

* * * * *